(12) United States Patent
Tononishi

(10) Patent No.: US 9,755,199 B2
(45) Date of Patent: Sep. 5, 2017

(54) ENERGY STORAGE APPARATUS

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/869,611

(22) Filed: Sep. 29, 2015

(65) Prior Publication Data

US 2016/0093855 A1 Mar. 31, 2016

(30) Foreign Application Priority Data

Sep. 30, 2014 (JP) .................................. 2014-202537
Aug. 20, 2015 (JP) .................................. 2015-162897

(51) Int. Cl.
*H01M 2/10* (2006.01)

(52) U.S. Cl.
CPC ...... *H01M 2/1077* (2013.01); *H01M 2220/10* (2013.01)

(58) Field of Classification Search
CPC ........................ H01M 2220/10; H01M 2/1077
See application file for complete search history.

(56) References Cited

U.S. PATENT DOCUMENTS

| 2012/0052359 | A1* | 3/2012 | Yoshitake | H01M 2/1077 429/120 |
| 2013/0171478 | A1 | 7/2013 | Ushijima | |
| 2013/0183544 | A1 | 7/2013 | Yoshioka et al. | |
| 2014/0302368 | A1* | 10/2014 | Wang | H01M 2/0242 429/99 |

FOREIGN PATENT DOCUMENTS

| JP | 2010-97723 A | 4/2010 |
| JP | 2013-152923 A | 8/2013 |
| JP | 2013-168355 A | 8/2013 |
| JP | 2014-203743 A | 10/2014 |
| JP | 2014-216151 A | 11/2014 |
| JP | 2014-216195 A | 11/2014 |

* cited by examiner

*Primary Examiner* — Mark F Huff
*Assistant Examiner* — Monique Wills
(74) *Attorney, Agent, or Firm* — McGinn IP Law Group, PLLC.

(57) ABSTRACT

An energy storage apparatus includes: a housing which has a container body and a lid portion provided with external connection terminals; an energy storage module which is arranged in the housing, the energy storage module having a cell stack; a bolt which restricts movement of the energy storage module with respect to a bottom wall of the container body; and a support member which restricts movement of the energy storage module with respect to the lid portion.

16 Claims, 12 Drawing Sheets

ENERGY STORAGE APPARATUS

CROSS-REFERENCE TO RELATED APPLICATIONS

This application claims the benefit of Japanese patent applications No. 2014-202537, filed on Sep. 30, 2014, and No. 2015-162897, filed on Aug. 20, 2015, which are incorporated by reference.

FIELD

The present invention relates to an energy storage apparatus which includes an energy storage device such as a secondary battery.

BACKGROUND

A secondary battery has been popularly used as a power source for electronic equipment such as a mobile phone or IT equipment, in addition to an application where a primary battery is replaced with a secondary battery. Particularly, a nonaqueous electrolyte secondary battery represented by a lithium ion secondary battery possesses high energy density and hence, the application of the nonaqueous electrolyte secondary battery to electrical equipment such as an electric vehicle has been in progress. Aiming at the outputting of high energy and the acquisition of large capacity, the secondary batteries have been used in general in the form of an energy storage module (power source module) which includes a plurality of secondary batteries.

An energy storage module has a cell stack formed by arranging a plurality of secondary batteries (energy storage devices) in a row, and the energy storage module is housed in a housing. By housing the energy storage module in the housing, the energy storage module is used as an energy storage pack (hereafter also referred to as "energy storage apparatus") which is portable and is also mountable on an external load (see FIGS. 1, 2 and the like of JP 2013-168355A, for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the case where the energy storage module is mounted on a hybrid vehicle or an electric vehicle as one energy storage apparatus in the form where the energy storage module is housed in the housing, when vibrations or an impact is applied to the energy storage apparatus, the energy storage module vibrates or swings in the inside of the housing. This brings about a damage on the energy storage module thus giving rise to a possibility that the reliability of the energy storage apparatus is impaired.

An object of the present invention to provide an energy storage apparatus by which an effect of impact or vibrations exerted on an energy storage module can be reduced so that reliability of the energy storage apparatus can be enhanced.

An energy storage apparatus according to an aspect of the present invention includes: a housing which has a container body and a lid portion provided with external connection terminals; an energy storage module which is arranged in the housing, the energy storage module having a cell stack; a first restricting portion which restricts movement of the energy storage module with respect to a bottom wall of the container body; and a second restricting portion which restricts movement of the energy storage module with respect to the lid portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
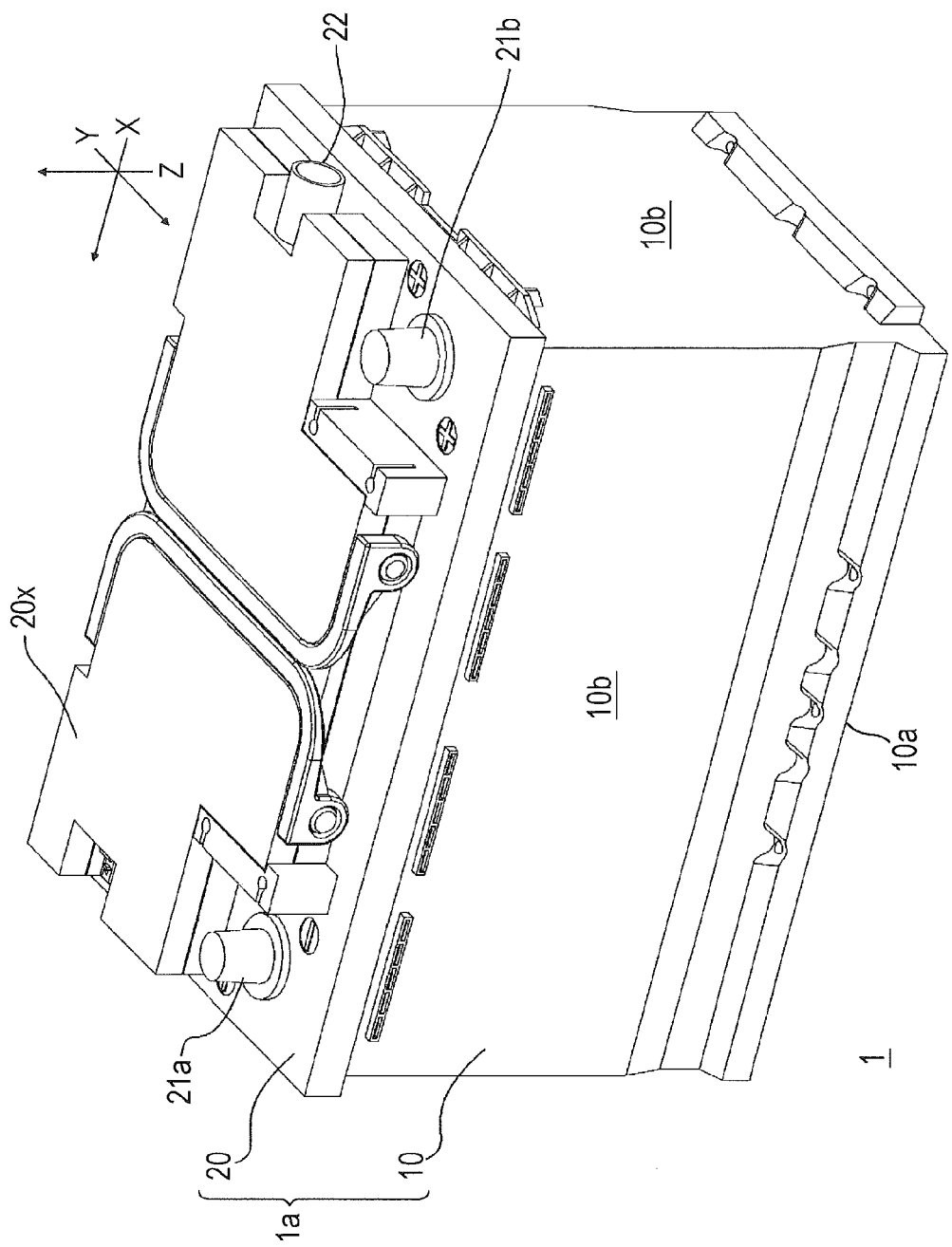
FIG. 1 is a perspective view showing a configuration of an energy storage apparatus according to an embodiment 1 of the present invention.

An aspect of the present invention is directed to an energy storage apparatus including: a housing which has a container body and a lid portion provided with external connection terminals; an energy storage module which is arranged in the housing, the energy storage module having a cell stack; a first restricting portion which restricts movement of the energy storage module with respect to a bottom wall of the container body; and a second restricting portion which restricts movement of the energy storage module with respect to the lid portion.

With such a configuration, the movement of the energy storage module with respect to the bottom wall of the housing can be restricted and, at the same time, the movement of the energy storage module with respect to the lid portion of the housing can be also restricted. By restricting the energy storage module on an upper side and a lower side of the housing, even when the energy storage apparatus receives vibrations or an impact from the outside, it is possible to suppress vibrations or swinging of the energy storage module in the inside of the housing and hence, the reliability of the energy storage apparatus can be enhanced.

The energy storage apparatus may be also configured such that the first restricting portion fixes the energy storage module to the bottom wall, and the second restricting portion fixes the energy storage module to the lid portion.

With such a configuration, the energy storage module is fixed to the bottom wall of the housing and, at the same time, the energy storage module is also fixed to the lid portion of the housing. In this manner, by fixing the energy storage module on the upper side and the lower side of the housing, even when the energy storage apparatus receives vibrations or an impact from the outside, it is possible to suppress vibrations or swinging of the energy storage module in the inside of the housing, effectively.

The energy storage apparatus may be also configured such that the second restricting portion is disposed at positions which correspond to both ends of the cell stack.

With such a configuration, the second restricting portion is arranged at the positions which correspond to both ends of the cell stack and hence, the energy storage module is fixed at a plurality of positions on an upper side thereof whereby the swinging of the energy storage module generated in a direction that the energy storage module is rotated can be suppressed.

The energy storage device may be also configured such that the second restricting portion is connected to the lid portion outside a region where the energy storage module is positioned as viewed in a direction toward the bottom wall from the lid portion.

With such a configuration, the second restricting portion is connected to the lid portion outside the region where the energy storage module is positioned as viewed in a top plan view and hence, the second restricting portion is arranged at the position away from the energy storage module whereby the swinging of the energy storage module generated in a direction that the energy storage module is rotated can be effectively suppressed.

The energy storage apparatus may be also configured such that the second restricting portion is connected to the lid portion within a region where the energy storage module is positioned as viewed in a direction toward the bottom wall from the lid portion.

With such a configuration, the second restricting portion is connected to the lid portion within the region where the energy storage module is positioned as viewed in a top plan view and hence, a width of the housing can be made small whereby the energy storage apparatus can be reduced in size.

The energy storage apparatus may be also configured such that the second restricting portion is connected to the energy storage module within a region where the energy storage module is positioned as viewed in a direction toward the bottom wall from the lid portion.

With such a configuration, the second restricting portion is connected to the energy storage module within the region where the energy storage module is positioned as viewed in a top plan view and hence, a width of the housing can be made small whereby the energy storage apparatus can be reduced in size.

The energy storage apparatus may be also configured such that the second restricting portion has a bent portion between a connecting portion between the second restricting portion and the energy storage module and a connecting portion between the second restricting portion and the lid portion.

With such a configuration, the second restricting portion has the bent portion between the connecting portion for connecting the second restricting portion and the energy storage module to each other and the connecting portion for connecting the second restricting portion and the lid portion to each other and hence, the bent portion functions as a buffer device and absorbs an impact when a large impact is applied to the energy storage apparatus thus reducing an effect of impact exerted on the energy storage module.

The energy storage apparatus may be also configured such that the cell stack includes end plates which sandwich a plurality of the energy storage devices arranged in a row from both ends of the row, and the second restricting portion is fixed to the end plates.

With such a configuration, the second restricting portion is fixed to end plates which sandwich the plurality of energy storage devices arranged in a row from both ends of the row and hence, the second restricting portion can be firmly fixed to the energy storage module.

The energy storage apparatus may be also configured such that the second restricting portion extends toward the lid portion from the energy storage module, and is inserted into an opening formed in the lid portion.

With such a configuration, the second restricting portion is inserted into the opening formed in the lid portion and hence, the second restricting portion interferes with an inner wall of the opening whereby the movement of the energy storage module in a direction along the lid portion and in a direction that the energy storage module is rotated can be restricted.

The energy storage apparatus may be also configured such that the cell stack is arranged in a direction that the plurality of energy storage devices is arranged toward the lid portion from the bottom wall.

With such a configuration, the cell stack is arranged in a direction that a plurality of energy storage devices is arranged in a row toward the lid portion from the bottom wall of the housing. Accordingly, the plurality of energy storage devices can be sandwiched between the first restricting portion and the second restricting portion in the direction that the plurality of energy storage devices is arranged in a row and hence, the movement of the energy storage module can be restricted. Accordingly, it is possible to suppress the vibrations or swinging of the energy storage module in the inside of the housing in a stable manner.

As described above, the aspects of the present invention can acquire an advantageous effect that the reliability of the energy storage apparatus can be enhanced by reducing an effect of impact or vibrations exerted on the energy storage apparatus.

Hereinafter, embodiments of the present invention are described with reference to drawings. All of embodiments described hereinafter show one specific preferable example of the present invention. Numerical values, shapes, materials, elements of the present invention, arrangement positions of the elements, connection states and the like described in the following embodiments merely show one example, and these are not described with the intension of limiting the present invention. Among elements in the embodiments described hereinafter, elements which are not described in independent claims which express uppermost concepts are described as arbitrary elements. Respective drawings are provided for describing the energy storage apparatus so that the parts are not necessarily described strictly and accurately in these drawings.

(Embodiment 1)

(1. Energy Storage Apparatus)

Figure 2:
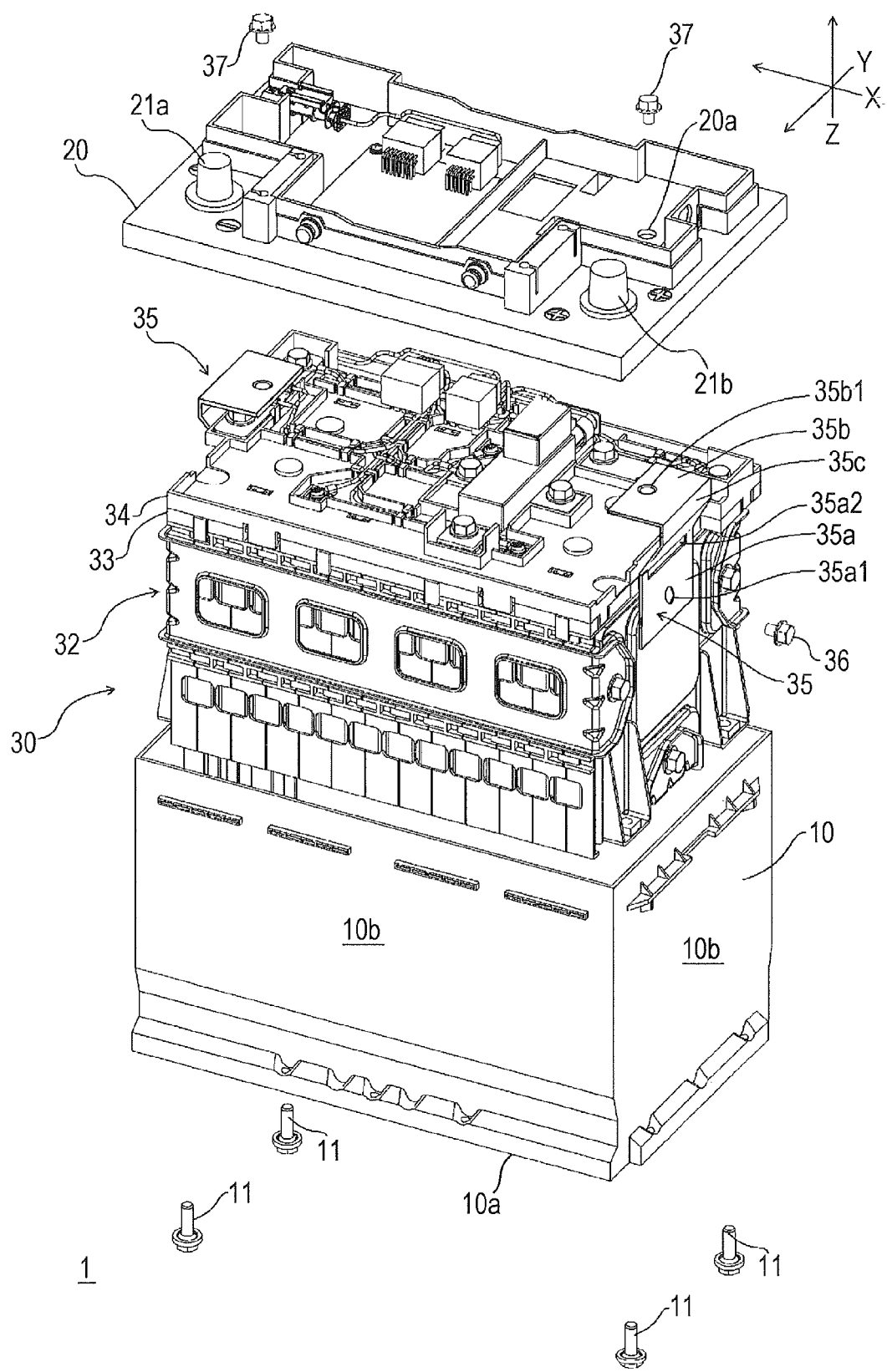
FIG. 2 is an exploded perspective view showing the configuration of the energy storage apparatus.

FIG. 1 is a perspective view showing the configuration of an energy storage apparatus 1 according to an embodiment 1, and FIG. 2 is an exploded perspective view showing the configuration of the energy storage apparatus 1 in a partially exploded state. In FIG. 2, an upper surface portion 20x of a lid portion 20 shown in FIG. 1 is omitted.

As shown in FIG. 1, the energy storage apparatus 1 is an energy storage pack (power source pack) which includes a housing 1a having a hexahedral outer shape. The housing 1a is constituted of an open box-shaped container body 10 and the lid portion 20 both of which are made of a synthetic resin such as polypropylene. The container body 10 includes: a rectangular plate-shaped bottom wall 10a; and four rectangular plate-shaped side walls 10b which are raised from an outer periphery of the bottom wall 10a. The lid portion 20 is a rectangular plate-shaped member which closes an opening of the container body 10, and has a flat-plate-shaped upper surface portion 20x which forms an upper surface of the lid portion 20.

External connection terminals 21a, 21b are mounted on the lid portion 20. That is, the energy storage apparatus 1 includes the external connection terminal 21a forming a negative electrode terminal and the external connection terminal 21b forming a positive electrode terminal. Both external connection terminals 21a, 21b are exposed from an upper surface of the lid portion 20 and are connected to an external load not shown in the drawing. The energy storage apparatus 1 also includes an exhaust sleeve 22 which makes an inner space and an outer space of the housing 1a communicate with each other.

As shown in FIG. 2, the energy storage apparatus 1 houses an energy storage module body 30 in the inside of the container body 10 of the housing 1a. The energy storage module body 30 is configured such that a cell stack 32, a bus bar assembly unit 33 and an electrical component sub unit 34 are stacked/placed in this order from the bottom wall 10a side of the container body 10. The energy storage module body 30 is fixed to the bottom wall 10a of the container body 10 by bolts 11 which are inserted into through holes (not shown in the drawing because of being disposed in blind spots) formed in the bottom wall 10a of the container body 10. That is, the bolts 11 function as a first restricting portion which restricts the movement of the energy storage module body 30 with respect to the bottom wall 10a of the container body 10. The respective configurations of the cell stack 32, the bus bar assembly unit 33 and the electrical component sub unit 34 are described in detail later.

The container body 10 is closed so as to keep airtightness by joining the lid portion 20 to the container body 10 by suitable means such as adhesion, ultrasonic welding or heat welding. As another means for joining the container body 10 and the lid portion 20 to each other, the container body 10 and the lid portion 20 may be fastened to each other by screws, bolts or the like with a gasket interposed therebetween. A gas generated from the cell stack 32 formed by arranging a plurality of batteries is discharged from both side surfaces of the energy storage module body 30. The whole housing 1a has airtightness so that the discharged gas stays in the housing 1a and, thereafter, is discharged to the outside of the energy storage apparatus 1 through the exhaust sleeve 22 of the lid portion 20.

Support members 35 which are fixed to end plates 32a (described later) of the cell stack 32 are arranged on both side surfaces of the energy storage module body 30. That is, the support members 35 are arranged at positions corresponding to both ends of the cell stack 32. In this embodiment, for example, the support member 35 is a member which is formed by bending a strip-like base metal member made of steel or stainless steel into an approximately L shape, and connects the energy storage module body 30 and the lid portion 20 to each other. In this embodiment, the support members 35 fix the energy storage module body 30 to the lid portion 20. That is, the support members 35 function as second restricting portions which restrict the movement of the energy storage module body 30 with respect to the lid portion 20.

As described later, in the energy storage apparatus 1, the energy storage module body 30 and the lid portion 20 are connected to each other by bus bars which connect electrode terminals of the batteries in the energy storage module body 30 and the external connection terminals 21a, 21b to each other. However, the support members 35 are members different from the bus bars. That is, in the energy storage apparatus 1, the support members 35 have a function of fixing the energy storage module body 30 and the lid portion 20, but the bus bars do not have such a function.

To be more specific, as shown in FIG. 2, the support member 35 is formed of: a side plate portion 35a which is disposed parallel to the side surface of the energy storage module body 30; a top plate portion 35b which is disposed parallel to a rear surface of the lid portion 20 which is in a blind spot in the drawing; and a connecting portion 35c which connects the side plate portion 35a and the top plate portion 35b to each other. The top plate portion 35b is positioned on an upper surface of the energy storage module body 30 in an overlapping manner.

A mounting hole 35a1 is formed in the side plate portion 35a, and a bolt 36 is fastened to the cell stack 32 through the mounting hole 35a1. A slit 35a2 which discharges a gas generated from the cell stack 32 therethrough is also formed in the side plate portion 35a. A mounting hole 35b1 which is coaxial with a mounting hole 20a formed in a main surface of the lid portion 20 is formed in the top plate portion 35b, and a bolt 37 is fastened to the top plate portion 35b through the mounting holes 20a, 35b1.

Assume that the arrangement direction of batteries in the cell stack 32 of the energy storage module body 30 is aligned with a straight line which is parallel to an X axis of an orthogonal coordinate system consisting of the X axis, a Y axis and a Z axis shown in FIG. 1 and the like. Also assume that the respective surfaces of the housing 1a, the energy storage module body 30 and the like which form the energy storage apparatus 1 are positioned approximately parallel to the X axis, the Y axis and the Z axis respectively. Still further, in the description made hereinafter, with respect to the directions indicated by arrows in the drawings, assume that the direction extending from the right side to the left side in the drawings is the X axis direction, the direction extending from the depth side to the front side in the drawings is the Y axis direction, and the direction extending from the lower side to the upper side in the drawings is the Z axis direction. The Z axis direction agrees with the vertical direction and hence, the energy storage module body 30 is arranged in the inside of the housing 1a using an X-Y plane which is orthogonal to the Z axis direction as a mounting surface.

(2. Energy Storage Module Body)

Figure 3:
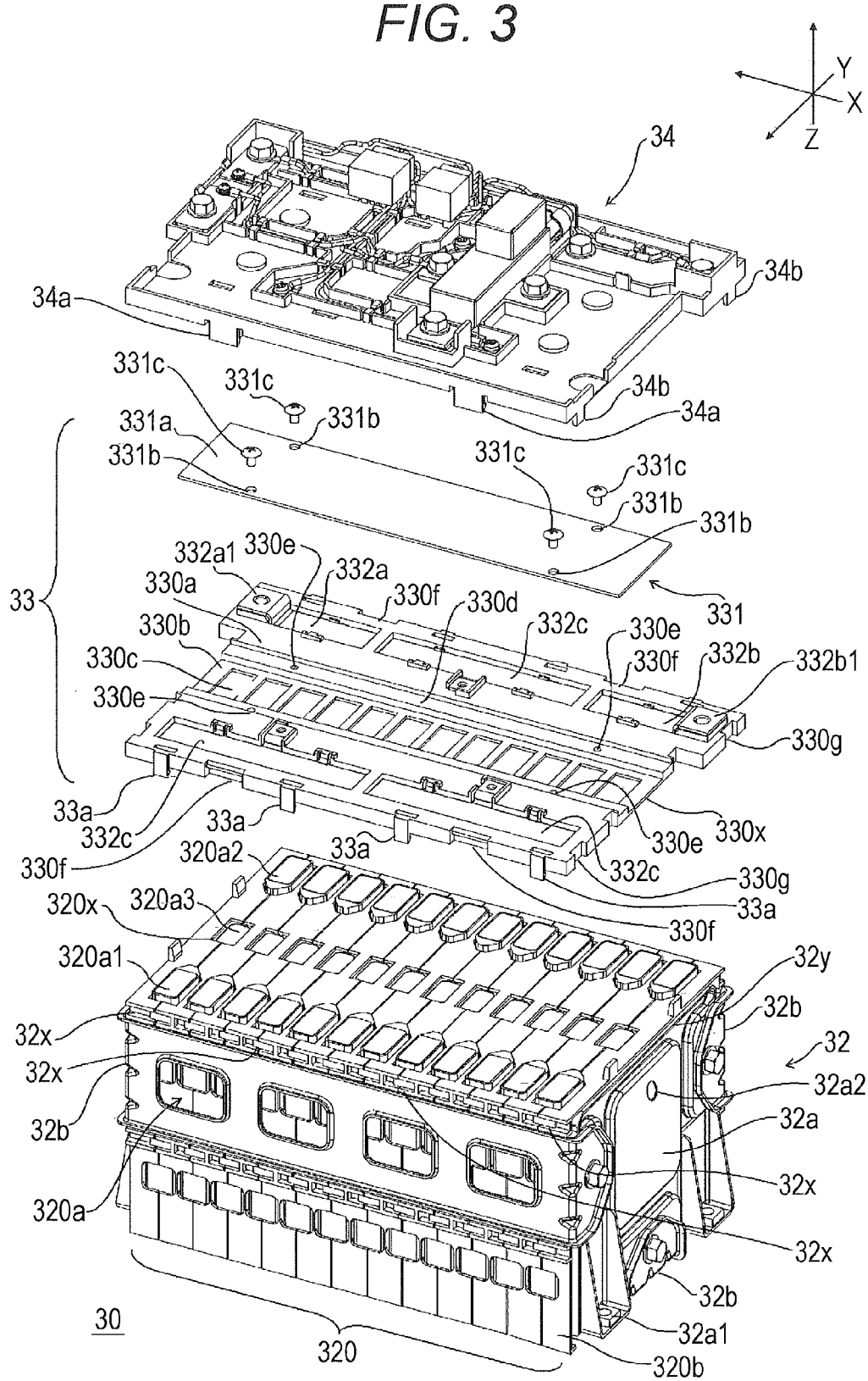
FIG. 3 is an exploded perspective view showing a configuration of an energy storage module body according to the embodiment 1.

FIG. 3 is an exploded perspective view with a part exploded showing the configuration of the energy storage module body 30. As shown in FIG. 3, the energy storage module body 30 includes: the cell stack 32 formed by arranging and fastening batteries such as nonaqueous electrolyte secondary batteries to each other in a row; a bus bar assembly unit 33 for electrically connecting the respective batteries of the cell stack 32 to each other; and an electrical component sub unit 34 which is electrically connected with the bus bar assembly unit 33.

(2-1. Cell Stack)

The cell stack 32 includes: a cell stack body 320 formed by arranging a plurality of batteries 320a in a row; spacers 320b having an insulating property each of which insulates the adjacently arranged batteries 320a from each other; and a pair of end plates 32a and a set of stack bars consisting of three stack bars 32b provided for binding the cell stack body 320 and the spacers 320b. In the cell stack body 320, the plurality of batteries 320a is arranged in a row such that a negative electrode terminal 320a1, a positive electrode terminal 320a2 and a safety valve 320a3 are disposed on an upper surface of each battery. Each spacer 320b is arranged between two batteries 320a so as to cover a surface of the cell stack body 320. The pair of end plates 32a and the set of stack bars consisting of three stack bars 32b are binding members which are mounted on the surface of the cell stack body 320 and surfaces of the spacers 320b for maintaining the cell stack body 320 and the spacer 320b in a fixed shape.

Each one of the plurality of batteries 320a forms an energy storage device which includes: an open box-shaped outer covering body made of metal such as aluminum; and a lid plate made of a material substantially equal to a material for forming the outer covering body. The battery 320a has a flat angular columnar profile shape where an upper surface and a lower surface of the battery 320a are formed of a front surface of the lid plate and a bottom surface of the outer covering body which is a surface on a side opposite to the front surface of the lid plate respectively. An electrode assembly, an electrolyte solution and the like are sealed in the outer covering body. The lid plate closes an opening of the outer covering body by being joined to the outer covering body by laser welding or the like. The electrode terminals 320a1, 320a2 and the safety valve 320a3 are mounted on the lid plate. In each battery 320a, a front surface of the outer covering body may be directly exposed, or the front surface of the outer covering body may be covered by an insulating film.

The cell stack body 320 is configured as follows. That is, a surface of the battery 320a having the largest area among all side surfaces of the battery 320a is assumed as a long side surface, and the batteries 320a are arranged such that the long side surfaces of the batteries 320a face each other in an opposed manner with the spacer 320b interposed between two adjacently arranged batteries 320a. The spacers 320b are arranged in a row, and openings for exposing the electrode terminals 320a1, 320a2 and the safety valve 320a3 of the battery 320a to the outside are formed in an upper surface of each spacer 320b. In the drawing, only opening 320x which exposes the safety valve 320a3 is indicated by symbol.

The end plates 32a sandwich the cell stack body 320 formed by arranging the plurality of batteries 320a in a row from both ends of the cell stack body 320. That is, the end plates 32a sandwich the cell stack body 320 such that the end plates 32a are disposed on side surfaces of the batteries 320a on both ends of the cell stack body 320. The stack bars 32b are adjacently arranged to both side surfaces and a bottom surface of the cell stack body 320 respectively. The stack bars 32b are fixed to the cell stack body 320 by fastening both ends of each stack bar 32b to surfaces of the pair of end plates 32a respectively by bolts. By fixing the stack bars 32b to the cell stack body 320, the cell stack body 320 and the spacers 320b are formed into an integral body so that a shape of the cell stack 32 is maintained.

Mounting holes 32a1 which open along the vertical direction are formed in a lower portion of the end plate 32a. The bolts 11 are inserted into the mounting holes 32a1 from the outside of the housing 1a. The mounting holes 32a1 and the bolts 11 are used for fixing the energy storage module body 30 and the bottom wall 10a of the container body 10 of the housing 1a to each other.

A mounting hole 32a2 is also formed in the end plate 32a at a position where the mounting hole 32a2 is coaxial with the mounting hole 35a1 formed in the side plate portion 35a of the support member 35.

(2-2. Bus Bar Assembly Unit)

The bus bar assembly unit 33 is a member made of a synthetic resin having an insulating property and corrosion resistance to an electrolyte solution. The bus bar assembly unit 33 is made of polypropylene, for example. The bus bar assembly unit 33 includes a frame body 330a which conforms to a profile of an upper surface of the cell stack 32, and openings are formed in the frame body 330a at positions corresponding to the electrode terminals 320a1, 320a2 and the safety valves 320a3 which are exposed from the cell stack 32. As a material for forming the frame body 330a, a synthetic resin such as a polybutylene terephthalate (PBT) resin having an insulating property and a heat resistant property may be used.

Sizes of the openings which are formed in the frame body 330a at the positions corresponding to the electrode terminals 320a1, 320a2 are set such that each opening extends between and over the electrode terminals arranged adjacently to each other in a straddling manner so as to control a connection pattern between the electrode terminals corresponding to an electrical connection between the respective batteries 320a. A metal bus bar 332a, a metal bus bar 332b and metal bus bars 332c which are connected to the electrode terminals 320a1 and the electrode terminals 320a2 by laser welding or the like are embedded in the openings respectively. The bus bar 332a and the bus bar 332b are used for connecting the electrode terminals in the cell stack 32 to each other and for connecting the cell stack 32 to the external connection terminals 21a, 21b of the energy storage apparatus 1, and the bus bars 332c are used for connecting the electrode terminals in the cell stack 32 to each other.

In this manner, in the energy storage apparatus 1, the energy storage module body 30 and the lid portion 20 are connected to each other by bus bars such as the bus bars 332a, 332b which connect the electrode terminals 320a1, 320a2 of the batteries 320a and the external connection terminals 21a, 21b to each other. In this embodiment, the support members 35 perform a function of fixing the energy storage module body 30 to the lid portion 20 and hence, it is sufficient for the bus bars to have a function of electrically connecting the members in the energy storage apparatus 1, and the bus bars are not required to have a strength required for fixing the energy storage module body 30 to the lid portion 20.

On the other hand, openings 330c which are formed in the frame body 330a at the positions corresponding to the safety valves 320a3 are formed individually in accordance with the number of batteries 320a which form the cell stack body 320.

A groove portion 330x is formed in the frame body 330a at a position which corresponds to the openings 330c, and the groove portion 330x has a two-stage step as viewed from a front surface of the frame body 330a, and both ends of the groove portion 330x reach both ends of the frame body 330a. The groove portion 330x is formed of: a lower stage surface 330b which extends along the arrangement direction of the safety valves 320a3 and in which the openings 330c are formed; and intermediate stage surfaces 330d which are formed on edges of the lower stage surface 330b.

Engaging pawls 33a are formed on a peripheral edge of the frame body 330a corresponding to fitting holes 32x which are positioned on a peripheral edge of an upper surface of the cell stack 32, and are formed in conformity with a shape of a surface of the spacer 320b. Engaging grooves 330f and engaging grooves 330g are also formed on the peripheral edge of the frame body 330a for joining the frame body 330a to the electrical component sub unit 34 described later.

A heat insulator 331 is arranged above the groove portion 330x. The heat insulator 331 is a member which blocks heat radiated from the cell stack 32 thus reducing a thermal effect on members which are positioned above the bus bar assembly unit 33. The heat insulator 331 is also a member for reinforcing the energy storage module body 30. The members which are positioned above the bus bar assembly unit 33 are members which respectively constitute the energy storage apparatus 1 such as the electrical component sub unit 34, the lid portion 20, and electrical components incorporated in the lid portion 20 described later. The heat insulator 331 is formed of a metal-made heat insulating body plate 331a having a rectangular shape which conforms to a profile of the groove portion 330x of the bus bar assembly unit 33, and the heat insulator 331 is fitted in the intermediate stage surface 330d of the groove portion 330x.

The heat insulator 331 is fixed to the bus bar assembly unit 33 by making mounting screws 331c threadedly engage with mounting holes 330e formed in the frame body 330a of the bus bar assembly unit 33 through through holes 331b formed in the heat insulating body plate 331a. With such a configuration, both ends of a space surrounded by the heat insulator 331 and the groove portion 330x are communicated with the slits 35a2 formed in the support members 35 shown in FIG. 2 so that a gas passage is formed. The gas flow passage is provided for discharging an exhaust gas discharged from the safety valves 320a3 of the respective batteries 320a of the cell stack 32 to the inside of the housing 1a through the slits 35a2.

(2-3. Electrical Component Sub Unit)

The electrical component sub unit 34 is a unit which is formed by arranging electrical components on a base made of a synthetic resin which is a material substantially equal to the material for forming the frame body 330a of the bus bar assembly unit 33. In this embodiment, the electrical components arranged on the electrical component sub unit 34 are electrical wires which extend via the bus bars 332a, 332b, switches including relay switches, resistors, harnesses which are connected to the bus bars 332a, 332b, 332c and the like. The electrical component sub unit 34 and the bus bar assembly unit 33 are electrically connected with each other by mounting bolts in mounting terminal portions 332a1, 332b1 formed on the bus bars 332a, 332b respectively from an upper surface of the electrical component sub unit 34. In the inside of the lid portion 20 which is positioned above the electrical component sub unit 34, a BMU (Battery Management Unit), an electronic part which controls charging and discharging of the energy storage apparatus 1, an electronic part which controls a state of the energy storage apparatus 1 such as a temperature of the energy storage apparatus 1, and an electronic part which allows the energy storage apparatus 1 to perform the communication with equipment to which the energy storage apparatus 1 is connected are arranged as electrical components.

In the energy storage module body 30, the cell stack 32 and the bus bar assembly unit 33 are fixed to each other by making the engaging pawls 33a of the bus bar assembly unit 33 engage with the fitting holes 32x of the cell stack 32. The bus bar assembly unit 33 and the electrical component sub unit 34 are fixed to each other by making engaging pawls 34a, 34b formed on the peripheral edge of the electrical component sub unit 34 engage with the engaging grooves 330f, 330g of the bus bar assembly unit 33 respectively. With such a configuration, the cell stack 32, the bus bar assembly unit 33 and the electrical component sub unit 34 are assembled into an integral body.

In the energy storage apparatus 1 having the above-mentioned configuration, the housing 1a corresponds to "housing", and the energy storage module body 30 corresponds to "energy storage module" described in claims. The bolt 11 is included in "first restricting portion", and the support member 35 is included in "second restricting portion" described in claims.

The energy storage apparatus 1 of the embodiment 1 having such a configuration includes: the bolts 11 for connecting (fixing) the energy storage module body 30 and the bottom wall 10a of the container body 10 of the housing 1a to each other; and the support members 35 for connecting (fixing) the energy storage module body 30 and the lid portion 20 of the housing 1a to each other.

Figure 4:
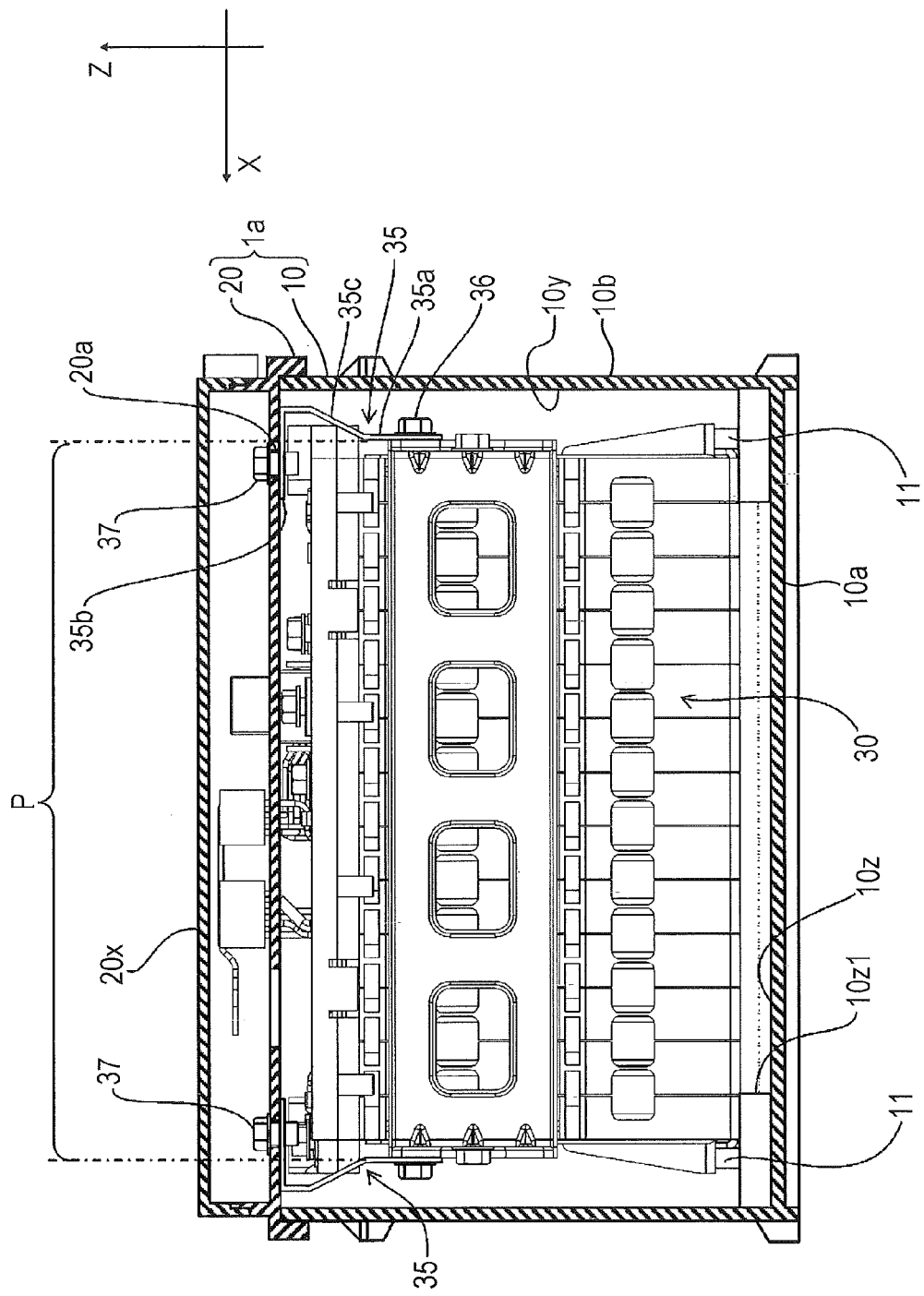
FIG. 4 is a schematic cross-sectional view showing a part of the energy storage apparatus.

FIG. 4 is a schematic cross-sectional view showing a part of the energy storage apparatus 1. To be more specific, FIG. 4 is a front view of the energy storage apparatus 1 where the lid portion 20 and the container body 10 of the housing 1a are shown in cross section.

As shown in FIG. 4, the energy storage module body 30 is fixed to the bottom wall 10a of the container body 10 by the bolts 11 in the inside of the housing 1a. To be more specific, a pedestal 10z1 is arranged on an inner bottom surface 10z (an upper surface of the bottom wall 10a) of the container body 10, and the energy storage module body 30 is mounted on and fixed to the pedestal 10z1. The energy storage module body 30 is fixed to the lid portion 20 by means of the support members 35 in the inside of the housing 1a. With such a configuration, the energy storage module body 30 is fixed to the housing 1a at upper and lower ends thereof in the vertical direction which agrees with the Z axis direction in the drawing in the inside of the housing 1a.

With such a configuration, in the energy storage apparatus 1 of the embodiment 1, resistance against an impact or vibrations applied to the energy storage apparatus 1 from the outside is increased so that the reliability of the energy storage apparatus 1 is enhanced. That is, in a conventional assembled battery (cell stack), a stability of an energy storage module body (energy storage module) housed in a housing is ensured by fixing the energy storage module body mainly to a mounting surface side of the housing. However, in such a conventional configuration, when vibrations or an impact are applied to the energy storage module body from the outside, the energy storage module body swings with respect to the housing using a mounting surface as a fulcrum. The center of gravity of the energy storage module body moves upward along with the increase of a size of a module and hence, there is a possibility that a stress to the energy storage module body due to swinging or a contact between the energy storage module body and the housing due to swinging lowers a mechanical strength of a module thus bringing about a defect such as a breaking of an insulating portion.

There has been also known a configuration where electrode terminals of batteries in an energy storage module and external connection terminals arranged on a lid portion of a housing are connected to each other by metal bus bars thus supporting the energy storage module by the lid portion. However, when vibrations or an impact are applied to an energy storage apparatus from the outside, the bus bar is damaged so that an electrical connection between the electrode terminals of the batteries and the external connection terminals is broken and hence, there is a possibility that the reliability of the energy storage apparatus is largely affected. Particularly, recently, a method of connecting bus bars and electrode terminals of batteries to each other is changed to welding from fastening by bolts so that there is a tendency that aluminum having a relatively low strength is adopted as a material for forming the bus bars. Accordingly, there is a possibility that the bus bar is damaged or a welded portion is peeled so that it has become necessary to take countermeasures for such a situation.

The energy storage apparatus 1 of the embodiment 1 has been made based on such observation and, in the energy storage apparatus 1 of the embodiment 1, the energy storage module body 30 is fixed to the housing 1a at the upper and lower ends thereof in the vertical direction so that the energy storage module body 30 and the housing 1a are formed into an integral body. That is, the energy storage module body 30 is fixed to the lid portion 20 using the support members 35 which are members different from the bus bars for connecting the electrode terminals 320a1, 320a2 of the batteries 320a and the external connection terminals 21a, 21b to each other. With such a configuration, the swinging is suppressed so that a stress applied to the energy storage module body 30 is reduced. Further, relative positions of the energy storage module body 30 and the housing 1a are maintained and hence, a possibility that the energy storage module body 30 and the housing 1a are brought into contact with each other is reduced thus enhancing the reliability of the energy storage apparatus 1.

In general, the side walls 10b of the container body 10 of the housing 1a have a large height and are formed with a smaller thickness than other portions of the housing 1a in many cases and hence, the side walls 10b of the container body 10 have a relatively low rigidity. On the other hand, the lid portion 20 and the bottom wall 10a of the container body 10 have a relatively high rigidity. Accordingly, among the members forming the housing 1a, by fixing the energy storage module body 30 to the lid portion 20 and the bottom wall 10a having a relatively large strength, the energy storage module body 30 can be firmly fixed to the housing 1a. The energy storage module body 30 can be fixed more easily to the lid portion 20 than to the side walls 10b and hence, workability at the time of manufacturing the energy storage apparatus 1 can be enhanced.

The energy storage apparatus 1 of the embodiment 1 is characterized in that the pair of support members 35 is fixed to both ends of the cell stack 32 respectively. With such a configuration, the energy storage module body 30 is fixed at a plurality of positions on an upper side thereof whereby the swinging of the energy storage module body 30 in the rotational direction can be suppressed in addition to the swinging in the direction parallel to the direction perpendicular to the mounting surface. Accordingly, a possibility that the energy storage module body 30 is twisted is reduced thus enhancing the reliability of the energy storage apparatus 1. Further, the pair of end plates 32a which is disposed at both ends of the cell stack 32 is used for fixing the support members 35 and hence, the support members 35 can be firmly fixed to the energy storage module body 30. Further, the support members 35 made of metal efficiently transfer heat generated in the cell stack 32 through the end plates 32a so that heat can be rapidly discharged to the outside.

In the energy storage apparatus 1 of the embodiment 1, the support member 35 has an approximately L shape. To be more specific, as shown in FIG. 4, the connecting portion 35c positioned between the side plate portion 35a which is directly fixed to the energy storage module body 30 and the top plate portion 35b which is directly fixed to the lid portion 20 is bent thus protruding toward an inner side surface 10y of the container body 10 from the side surface of the energy storage module body 30. That is, the support member 35 has the connecting portion 35c forming the bent portion between the connecting portion of the support member 35 with the energy storage module body 30 and the connecting portion of the support member 35 with the lid portion 20. In FIG. 4, the inner side surface 10y is an inner surface of the side wall 10b disposed on the right side (on the minus side in the X axis direction), and the description has been made with respect to the support member 35 disposed on the right side. However, the support member 35 disposed on the left side (on the plus side in the X axis direction) also has substantially the same configuration as the support member 35 disposed on the right side.

With such a configuration, the connecting portion 35c of the support member 35 functions as a buffer device so that, when a large impact is applied to the energy storage apparatus 1, the connecting portion 35c absorbs the impact whereby an effect of impact exerted on the energy storage module body 30 can be reduced. In this embodiment, the connecting portion 35c is included in "bent portion" described in claims. The connecting portion 35c may be bent in the direction away from the inner side surface 10y of the container body 10. Even with such a configuration, the connecting portion 35c can acquire an advantageous effect as the buffer device in the same manner as the above-mentioned constitutional example. The connecting portion 35c may be formed to have a curved shape.

The energy storage apparatus 1 of the embodiment 1 is characterized in that the top plate portion 35b of the support member 35 is positioned on the electrical component sub unit 34 forming the upper surface of the energy storage module body 30 in an overlapping manner as viewed in a top plan view. That is, the support member 35 is connected to the lid portion 20 within a region where the energy storage module body 30 is positioned as viewed in a direction toward the bottom wall 10a from the lid portion 20. With such a configuration, a portion of the top plate portion 35b connected with the lid portion 20 is positioned inside the projection surface P which is obtained by projecting the main surface of the energy storage module body 30 on the inner wall of the lid portion 20.

As a result, the fixing position of the top plate portion 35b can be set to a desired portion on the main surface of the lid portion 20 having a large area and hence, the degree of freedom in layout of the fixing position can be increased. That is, the productivity can be enhanced while acquiring the above-mentioned advantageous effect of the present invention by flexibly changing the configuration thereof in conformity with various shapes of the energy storage module body 30 or the housing 1a.

In this embodiment, the main surface of the energy storage module body 30 means a surface as understood from an outline of the main surface from which shapes of detailed parts protruding from respective sides and vertexes of the energy storage module body 30 are eliminated. To be more specific, peripheral edges of the mounting terminal portions 332a1, 332b1 of the bus bar assembly unit 33 shown in FIG. 3 are formed in a protruding manner from other sides of the bus bar assembly unit 33 which form the main surface having an approximately rectangular shape. However, as shown in FIG. 4, the shapes of the peripheral edges are not taken into account in the positional relationship thereof with the top plate portion 35b. The same goes for the following respective embodiments.

In the above-mentioned description, the description has been made assuming that the support member 35 has an approximately L shape and includes the connecting portion 35c forming the bent portion which protrudes from the side surface of the energy storage module body 30. However, the shape of the support member 35 is not limited to the approximately L shape. That is, provided that the support members 35 can fix the energy storage module body 30 at a plurality of positions on an upper side of the energy storage module body 30 in a state where the energy storage module body 30 is sandwiched between the mounting surface and the lid portion 20, the support members 35 is not limited with respect to specific shapes of the support members 35. Hereinafter, other configurations of the support member 35 are described.

(Modification 1 of Embodiment 1)

Figure 5:
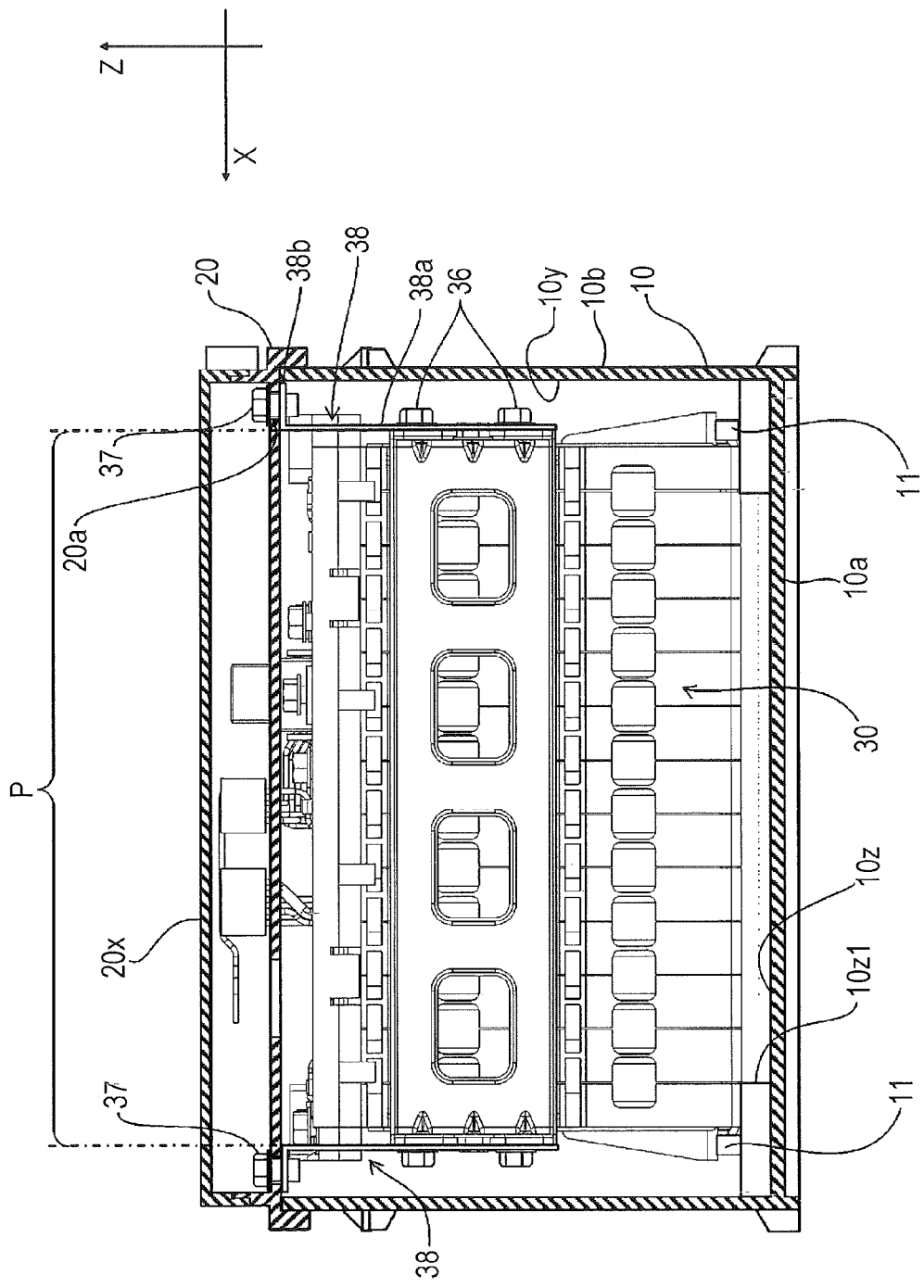
FIG. 5 is a schematic cross-sectional view showing a configuration of an energy storage apparatus according to a modification 1.

FIG. 5 is a schematic cross-sectional view showing a configuration of an energy storage apparatus 2 according to a modification 1 of the embodiment 1. To be more specific, FIG. 5 is a view which corresponds to FIG. 4 showing the above-mentioned energy storage apparatus of the embodiment 1.

As shown in FIG. 5, the energy storage apparatus 2 includes L-shaped support members 38 each of which is formed by integrally connecting a connecting portion and a side plate portion with each other. A side plate portion 38a of the support member 38 which forms a body portion is fixed to a cell stack 32 by fastening at a plurality of portions using bolts 36. A top plate portion 38b of the support member 38 is bent from the side plate portion 38a at an approximately right angle, and extends toward an inner side surface 10y of a container body 10 from an energy storage module body 30.

With such a configuration, a portion of the support member 38 which is fastened to a lid portion 20 through a mounting hole 20a formed in a main surface of the lid portion 20 using a bolt 37 protrudes from a side surface of the energy storage module body 30. That is, the support member 38 is connected to the lid portion 20 outside a region where the energy storage module body 30 is positioned as viewed in a direction toward a bottom wall 10a from the lid portion 20. In other words, the top plate portion 38b is positioned outside a projection surface P obtained by projecting a main surface of the energy storage module body 30 on an inner wall of the lid portion 20 as an inner wall which faces a mounting surface of the energy storage module body 30 with the energy storage module body 30 interposed therebetween.

With such a configuration, a distance between a pair of fixing portions where the lid portion 20 and the support member 38 are fixed to each other becomes larger than a distance between a pair of fixing portions in the energy storage apparatus 1 shown in FIG. 4 and hence, the swinging of the energy storage module body 30 which is generated in a direction that the energy storage module body 30 is rotated about the direction perpendicular to the mounting surface can be further effectively suppressed. Accordingly, a possibility that the energy storage module body 30 is twisted or bent can be further reduced. Further, the support member 38 has a simpler shape and hence, the support member 38 can be easily manufactured whereby the energy storage apparatus 2 can be manufactured at a low cost.

(Modification 2 of Embodiment 1)

Figure 6:
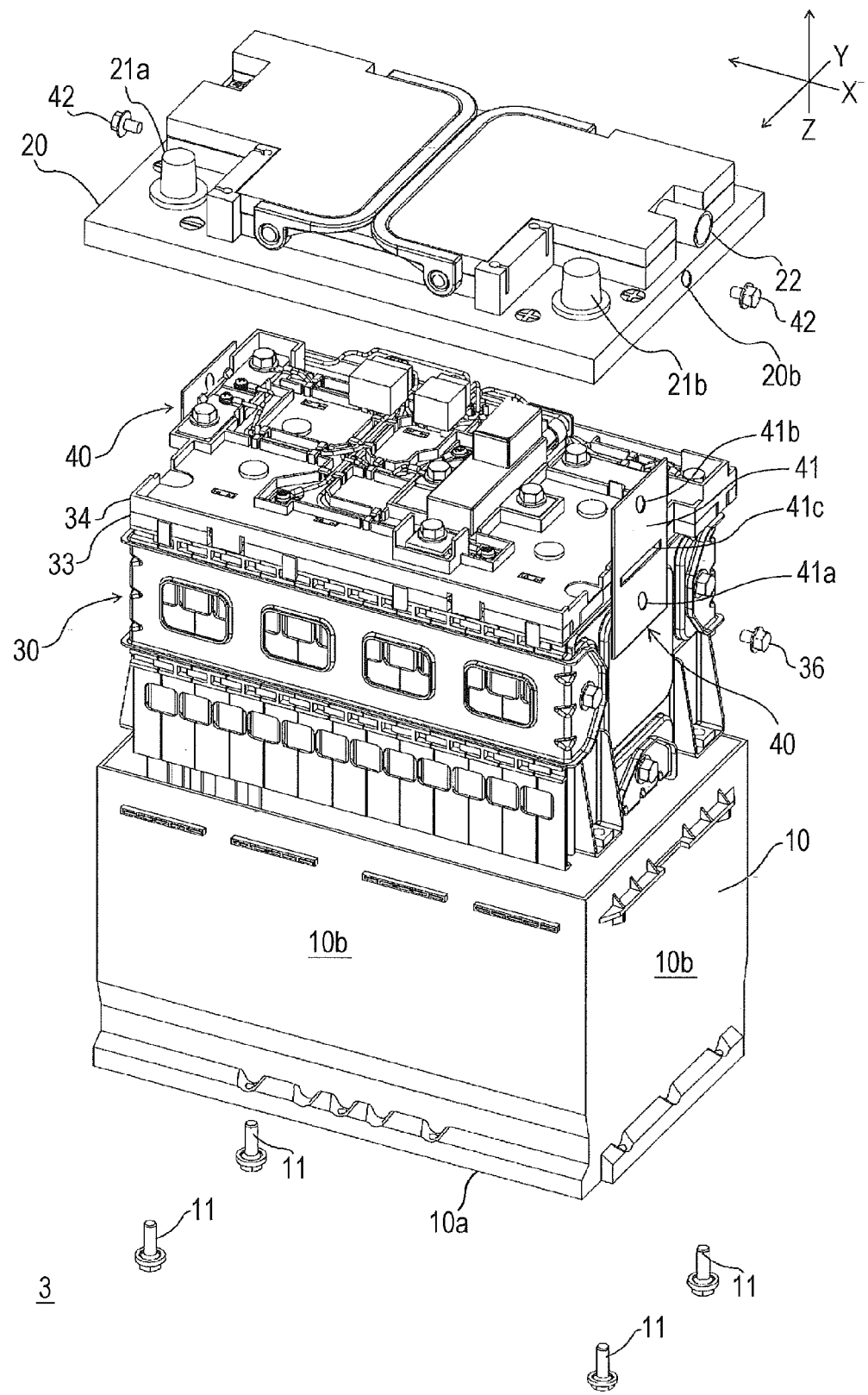
FIG. 6 is an exploded perspective view showing a configuration of an energy storage apparatus according to a modification 2.

FIG. 6 is an exploded perspective view showing the configuration of an energy storage apparatus 3 according to a modification 2 of the embodiment 1. To be more specific, FIG. 6 is a view which corresponds to FIG. 2 showing the energy storage apparatus of the embodiment 1.

As shown in FIG. 6, the energy storage apparatus 3 includes a flat-plate-shaped support member 40. A mounting hole 41a for fastening the support member 40 to the cell stack 32 is formed in a lower portion of a side plate portion 41 of the support member 40 which forms a body portion. A mounting hole 41b for fastening the support member 40 to the lid portion 20 is formed in an upper portion of the side plate portion 41 of the support member 40. Further, a slit 41c for discharging a gas generated from a cell stack 32 is formed in a center portion of the side plate portion 41 of the support member 40. The lid portion 20 and the support members 40 are fixed to each other by fastening using bolts 42 which pass through mounting holes 20b formed in side surfaces of the lid portion 20. Constitutional elements which are identical or correspond to the constitutional elements shown in FIGS. 1 to 4 are given the same symbol, and the detailed description of such constitutional elements is omitted. The same goes for the description made hereinafter.

With such a configuration, in the energy storage apparatus 3, the support member 40 includes the flat-plate-shaped side plate portion 41 and hence, the support member 40 can be easily manufactured whereby the energy storage apparatus 3 can be manufactured at a low cost. Further, the support member 40 can be further miniaturized and a thickness of the support member 40 can be reduced and hence, a distance between an inner side surface 10y of a housing 1a which is a position where the support member 40 is disposed and a surface of an energy storage module body 30 can be suppressed to a small distance. With such a configuration, the miniaturization of the energy storage apparatus can be realized or an energy storage module having a large capacity with a housing having the same size as the housing in the embodiment 1 can be realized while acquiring the advantageous effects substantially equal to the advantageous effects acquired in the above-mentioned embodiment 1.

(Embodiment 2)

Figure 7:
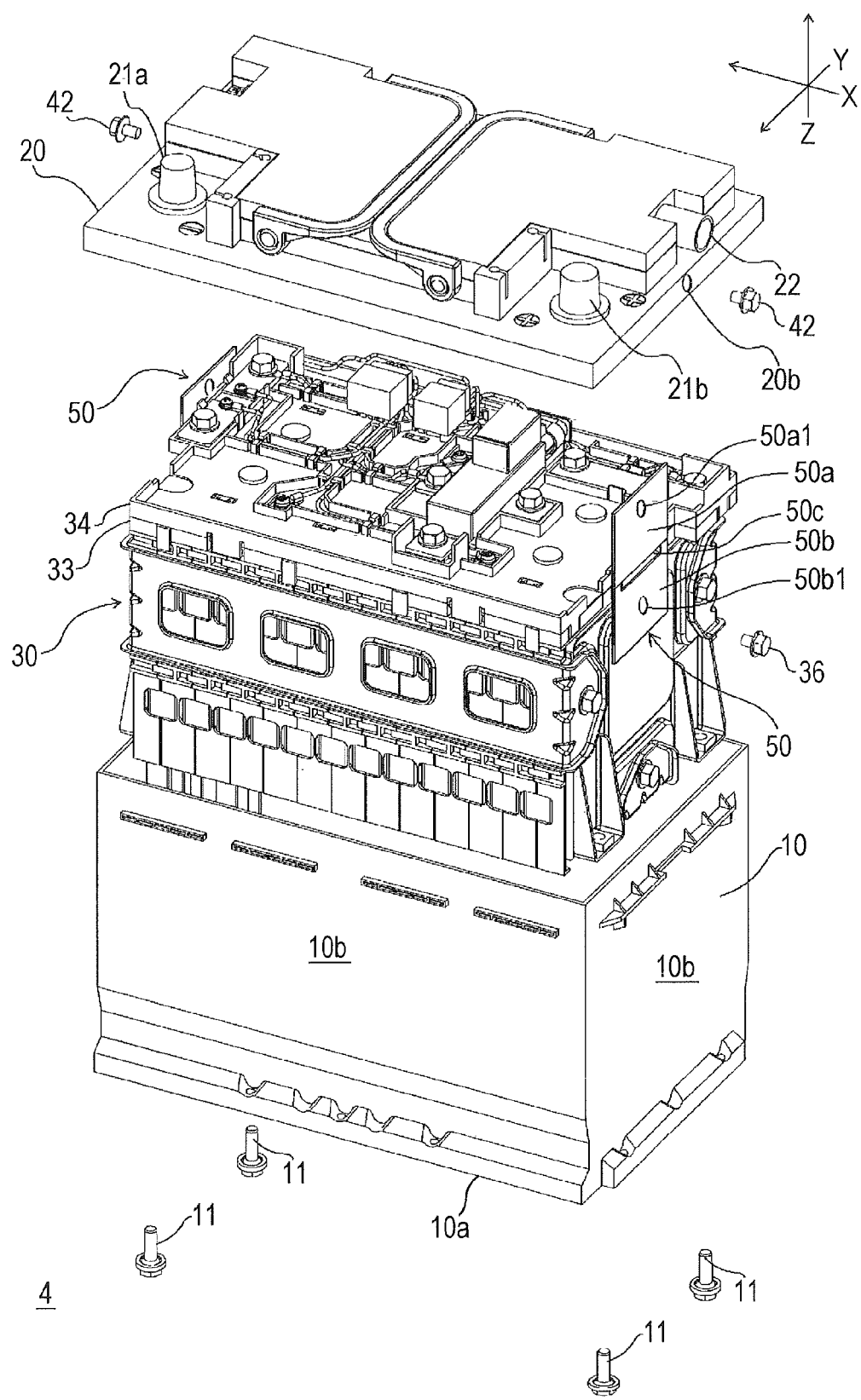
FIG. 7 is an exploded perspective view showing a configuration of an energy storage apparatus according to an embodiment 2 of the present invention.
Figure 8:
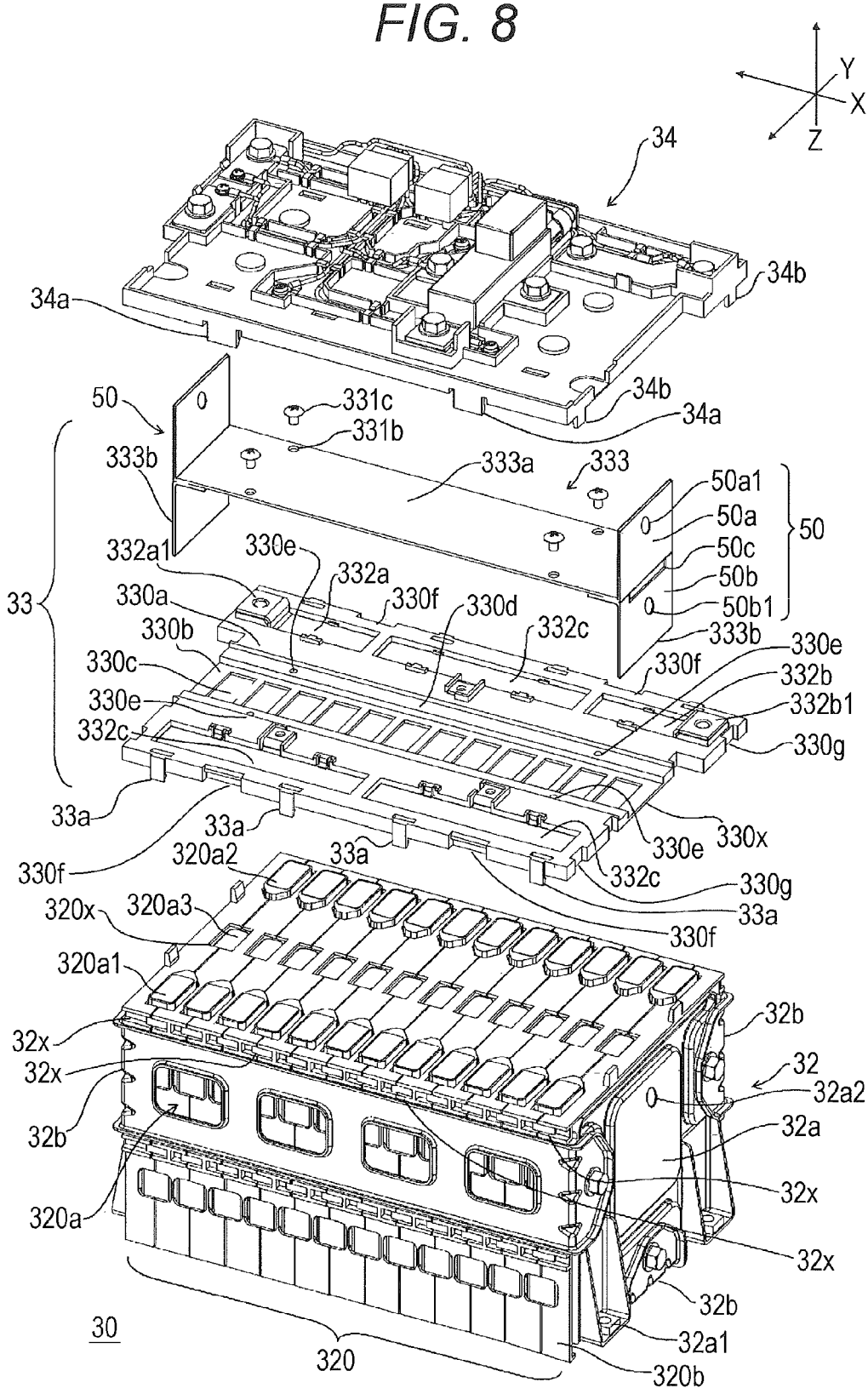
FIG. 8 is an exploded perspective view showing a configuration of an energy storage module body according to the embodiment 2.

FIG. 7 is a perspective view schematically showing with a part exploded a configuration of an energy storage apparatus 4 according to an embodiment 2. FIG. 8 is an exploded perspective view showing a configuration of an energy storage module body 30 according to the embodiment 2.

As shown in FIG. 7, the energy storage apparatus 4 of the embodiment 2 includes a pair of support members 50 each of which is formed of the combination of a side plate portion 50a and a side plate portion 50b. The side plate portion 50a is a rectangular flat-plate-shaped portion for fixing the energy storage module body 30 and a lid portion 20 to each other, and the side plate portion 50*b* is a rectangular flat-plate-shaped portion for fixing the support member 50 to a cell stack 32.

In the same manner as the side plate portion 41 of the support member 40 according to the modification 2 of the embodiment 1, a mounting hole 50*a*1 for fastening the support member 50 to the lid portion 20 is formed in an upper portion of the side plate portion 50*a*, and the side plate portion 50*a* is fixed to the lid portion 20 by threadedly fastening a bolt 42 to a mounting hole 20*b*. In the same manner as the side plate portion 35*a* of the support member 35 in the embodiment 1, a mounting hole 50*b*1 for fastening the support member 50 to an end plate 32*a* is formed in the side plate portion 50*b*, and the side plate portion 50*b* is fixed to the cell stack 32 by threadedly fastening a bolt 36 to the mounting hole 50*b*1.

The energy storage apparatus 4 of the embodiment 2 is characterized in that the support member 50 forms a part of constitutional parts of the energy storage module body 30. That is, as shown in FIG. 8, in a bus bar assembly unit 33 of the energy storage module body 30 in the embodiment 2, the pair of support members 50 is positioned at both ends of a heat insulator 333 positioned above a groove portion 330*x* formed in a frame body 330*a*.

The heat insulator 333 is constituted of a heat insulating body plate 333*a* having both ends thereof bent upward thus having a U-shaped profile; and a pair of auxiliary plates 333*b* which is joined to both ends of a lower surface of the heat insulating body plate 333*a*, and extends to the cell stack 32 side. Bent portions of the heat insulating body plate 333*a* correspond to the side plate portions 50*a* of the support members 50. A center portion of the heat insulating body plate 333*a* has the same shape and size as the heat insulating body plate 331*a* in the embodiment 1, and is fitted on the intermediate stage surface 330*d* of the groove portion 330*x*. The auxiliary plates 333*b* correspond to the side plate portions 50*b* of the support members 50.

The heat insulator 333 is fixed to the frame body 330*a* by threadedly fastening mounting screws 331*c* to mounting holes 330*e* formed in the frame body 330*a* of the bus bar assembly unit 33 through holes 331*b* formed in a surface of the heat insulating body plate 333*a*. With such a configuration, a space surrounded by the heat insulator 333 and the groove portion 330*x* forms a gas passage where both ends of the gas passage disposed directly below two side plate portions 50*a* are opened through slits 50*c* shown in FIG. 7 thus forming open ends. The gas passage allows an exhaust gas from safety valves 320*a*3 of respective batteries 320*a* of the cell stack 32 to be discharged to the inside of the housing 1*a* through the slits 50*c*.

In this manner, according to the energy storage apparatus 4 of the embodiment 2, in the same manner as the above-mentioned embodiment 1, the energy storage module body 30 and the bottom wall 10*a* of the housing 1*a* are fixed to each other using the bolts 11, and the energy storage module body 30 and the lid portion 20 of the housing 1*a* are fixed to each other using the support members 50. With such a configuration, in the same manner as the embodiment 1, a stress applied to the energy storage module body 30 in the inside of the housing 1*a* can be reduced and swinging of the energy storage module body 30 can be suppressed so that the reliability of the energy storage apparatus can be enhanced.

Further, in the embodiment 2, the support members 50 are provided as parts of the heat insulator 333 which is a functional part of the bus bar assembly unit 33 and hence, an additional step for assembling the support members can be omitted and the number of parts can be reduced whereby the energy storage apparatus 4 can be manufactured at a lower cost. Further, a distance of a space formed between an inner wall surface of the housing 1*a* and a surface of the energy storage module body 30 where the support member 50 is disposed can be suppressed to a smaller distance. With such a configuration, the miniaturization of the energy storage apparatus or a large capacity of an energy storage module with a housing having the same size as the housing in the embodiment 1 can be realized while acquiring the advantageous effects substantially equal to the advantageous effects acquired in the above-mentioned embodiment. Further, by providing the support members 50, heat generated from the heat insulating body plate 333*a* of the heat insulator 333 can be efficiently discharged to the outside.

Figure 9:
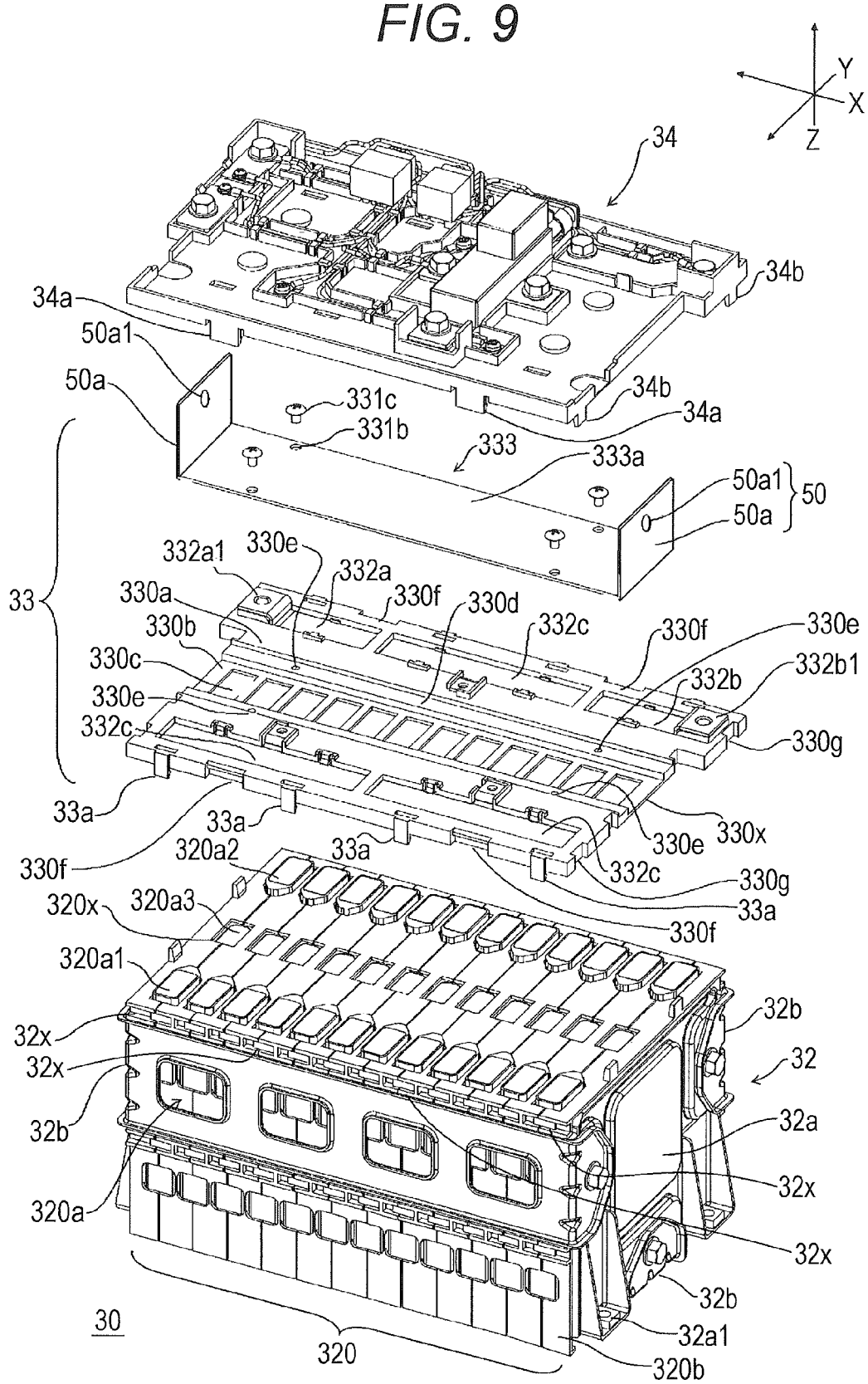
FIG. 9 is an exploded perspective view showing another example of the energy storage module body.

As shown in FIG. 9, the support member 50 may be formed of only the side plate portion 50*a*. FIG. 9 is an exploded perspective view showing another example of the energy storage module body 30 according to the embodiment 2.

In this example, the support member 50 and the energy storage module body 30 are joined to each other such that the heat insulating body plate 333*a* is fixed to the frame body 330*a* of the bus bar assembly unit 33 by threadedly fastening the mounting screws 331*c* to the frame body 330*a*. With such a configuration, an additional step for assembling the support members can be omitted and the number of parts can be reduced while acquiring the advantageous effects substantially equal to the advantageous effects acquired with the configuration shown in FIG. 8 so that the energy storage apparatus can be manufactured at a low cost. Further, the energy storage apparatus can be light-weighted.

(Embodiment 3)

Figure 10:
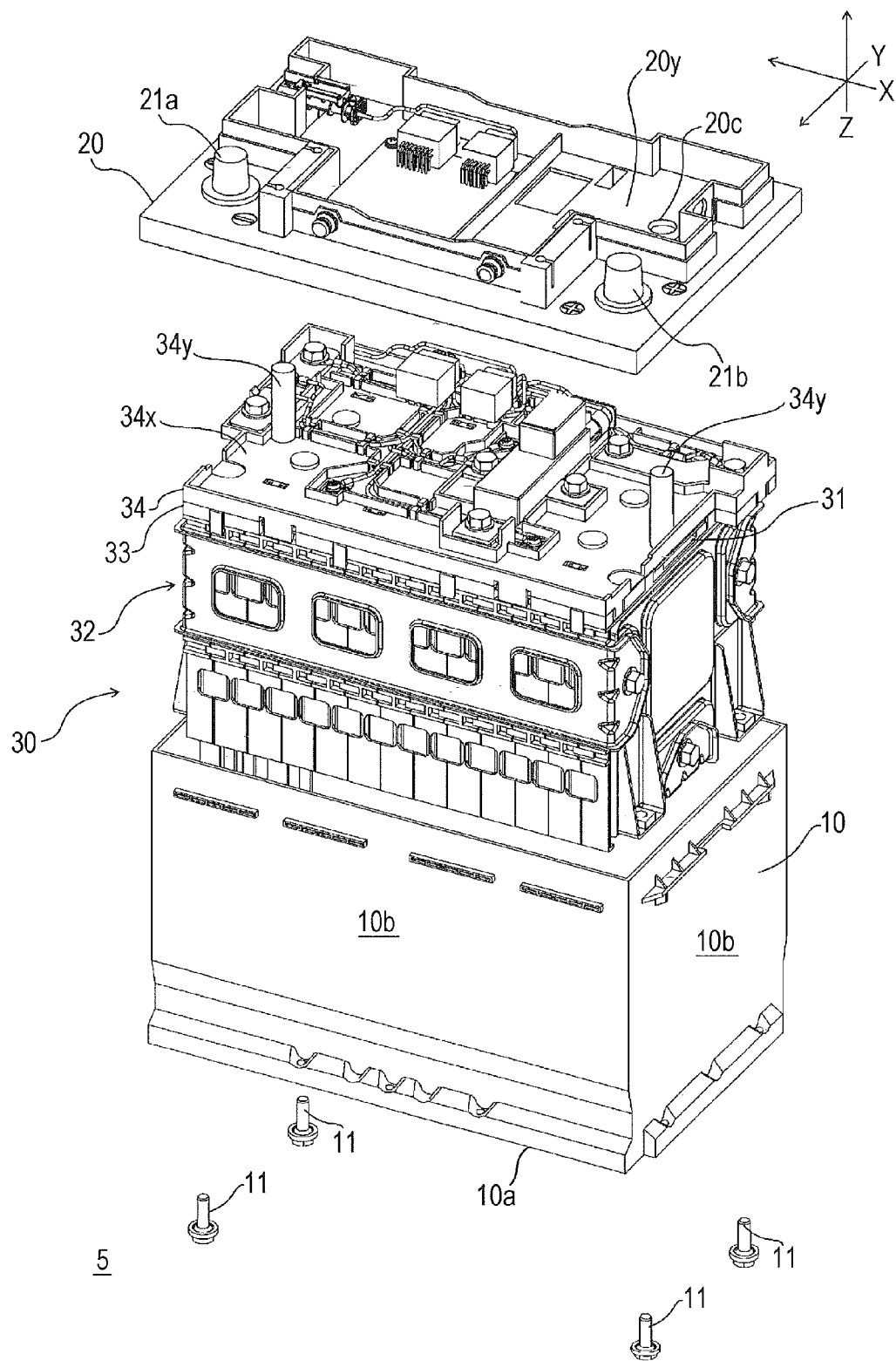
FIG. 10 is an exploded perspective view showing a configuration of an energy storage apparatus according to an embodiment 3 of the present invention.

FIG. 10 is a perspective view schematically showing with a part exploded of the configuration of an energy storage apparatus 5 according to an embodiment 3.

As shown in FIG. 10, the energy storage apparatus 5 of the embodiment 3 includes support portions 34*y* having a columnar shape which are positioned between an energy storage module body 30 and a lid portion 20 and protrude upward from an electrical component sub unit 34 of the energy storage module body 30. The support portions 34*y* are portions which are formed integrally with a base 34*x* of the electrical component sub unit 34 made of a synthetic resin by injection molding or the like. A distal end portion of each support portion 34*y* is fitted in an opening 20*c* formed in a front surface 20*y* of the lid portion 20, and further projects from the front surface 20*y*. That is, the support portions 34*y* extend toward the lid portion 20 from the energy storage module body 30, and are inserted in the openings 20*c* formed in the lid portion 20. Discharge ports 31 through which a gas generated from the cell stack 32 is discharged are directly exposed on side surfaces of the bus bar assembly unit 33.

The energy storage apparatus 5 of the embodiment 3 is characterized in that the movement of the energy storage module body 30 is restricted by maintaining a state where the distal end portions of the support portions 34*y* are fitted in the openings 20*c* formed in the lid portion 20.

Figure 11A:
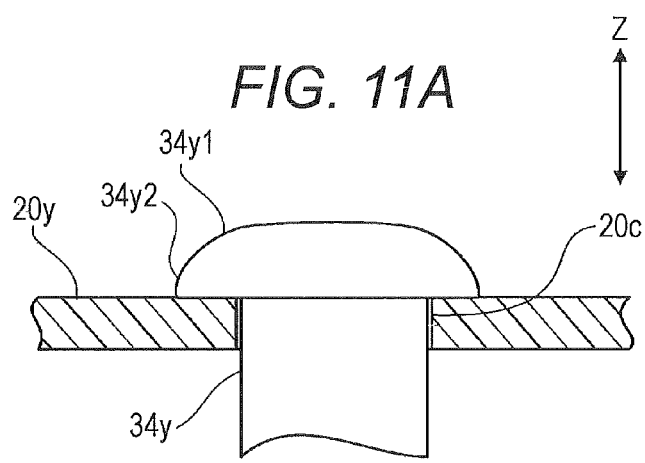
FIG. 11A is a cross-sectional view of a part showing an example of a support portion of the energy storage apparatus.
Figure 11B:
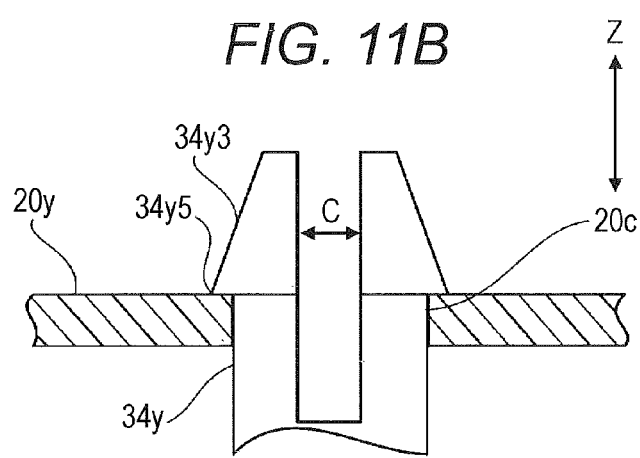
FIG. 11B is a cross-sectional view of a part showing an example of the support portion.
Figure 11C:
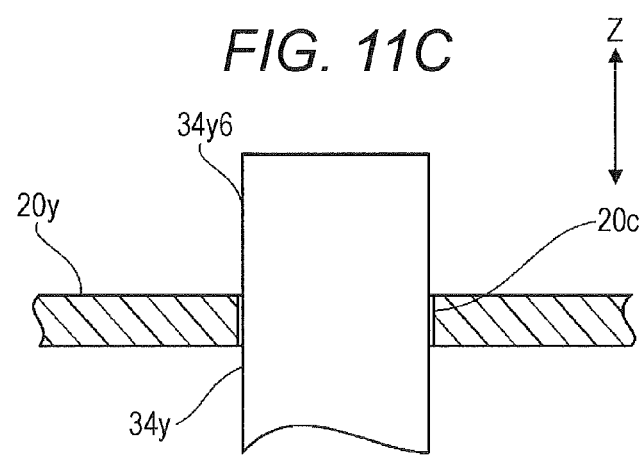
FIG. 11C is a cross-sectional view of a part showing an example of the support portion.

Hereinafter, the description is made with reference to FIGS. 11A to 11C. FIGS. 11A to 11C are cross-sectional views of parts each of which shows an example of the support portion 34*y* of the energy storage apparatus 5 according to the embodiment 3. That is, FIGS. 11A to 11C are views showing the configuration of the support portion 34*y* and the lid portion 20 of the energy storage apparatus 5 and an area around the support portion 34*y* and the lid portion 20. To be more specific, FIGS. 11A to 11C are cross-sectional views of the lid portion 20 taken along a plane parallel to the Z axis direction which is also an extending direction of the support portion 34y.

In the example shown in FIG. 11A, a distal end portion of the support portion 34y is heated and a terminal portion 34y1 is formed into a shape having a larger diameter than an opening 20c. A peripheral edge 34y2 of the terminal portion 34y1 obtained by such hot forming is fixedly mounted on a front surface 20y of the lid portion 20 so that the lid portion 20 and the energy storage module body 30 are fixed to each other.

With such a configuration, the energy storage module body 30 is fixed to the bottom wall 10a of the container body 10 by the bolts 11, and is fixed to the lid portion 20 by support portions 34y. Accordingly, in the same manner as the embodiments 1, 2, a stress applied to the energy storage module body 30 in the housing 1a can be reduced and, at the same time, the swinging of the energy storage module body 30 can be suppressed.

Next, in the example shown in FIG. 11B, a terminal portion 34y3 which includes a distal end portion of the support portion 34y has a gap C at the center thereof so that the terminal portion 34y3 is divided into two portions, and the divided portion has a tapered shape. With such a configuration, when the support portion 34y is inserted into the opening 20c, an outer shape of the terminal portion 34y3 is deformed such that a diameter of the terminal portion 34y3 is decreased in conformity with an inner diameter of the opening 20c, and the terminal portion 34y3 restores a shape thereof in a state where the terminal portion 34y3 projects from the front surface 20y. With such a configuration, an edge end 34y5 is engaged with the front surface 20y of the lid portion 20, and a front surface of the support portion 34y is pushed by an inner wall of the opening 20c so that the lid portion 20 and the energy storage module body 30 are fixed to each other.

With such a configuration, in the same manner as the example shown in FIG. 11A, a stress applied to the energy storage module body 30 in the inside of the housing 1a can be reduced and, at the same time, the swinging of the energy storage module body 30 can be suppressed.

In the example shown in FIG. 11C, a distal end portion of the support portion 34y has a terminal portion 34y6 having a columnar shape with the same fixed diameter from a proximal end thereof. With such a configuration, a state is maintained where the terminal portion 34y6 is inserted into the opening 20c, and is exposed from the front surface 20y of the lid portion 20 without being fixed to an inner wall of the opening 20c. In this case, when the energy storage apparatus 5 receives vibrations or an impact from the outside, the energy storage module body 30 tends to swing. However, the terminal portion 34y6 interferes with the inner wall of the opening 20c formed in the lid portion 20 and hence, the movement of the energy storage module body 30 is restricted on a plane orthogonal to the Z axis direction in the drawing, that is, in the translational direction and the rotational direction of the module with respect to a mounting surface. Accordingly, in the same manner as the above-mentioned respective embodiments, a stress applied to the energy storage module body 30 in the inside of the housing 1a can be reduced and, at the same time, the swinging of the energy storage module body 30 can be suppressed.

The configuration of the support portion 34y is not limited to the above-mentioned configurations. For example, the support portion 34y may be fixed to the lid portion 20 by threadedly fastening a screw to the lid portion 20. The support portion 34y may have a bolt portion at a distal end portion thereof, and the support portion 34y may be fixed to the lid portion 20 by making the bolt portion threadedly engage with a nut. The support portion 34y may be fixed to the lid portion 20 by caulking a distal end portion of the support portion 34y. The support portion 34y may be fixed to the lid portion 20 by making the support portion 34y adhered to the lid portion 20 using an adhesive agent or the like. A shape of the support portion 34y is not limited to a circular columnar shape, and the support portion 34y may have an angular columnar shape, a circular conical shape, an angular conical shape or the like. The support portion 34y may be formed of a solid member, or may be formed of a hollow member.

In this manner, the energy storage apparatus 5 of the embodiment 3 includes the support portions 34y which are formed integrally with the energy storage module body 30. That is, in the energy storage apparatus 5, in the same manner as the above-mentioned embodiments 1, 2, the energy storage module body 30 and the bottom wall 10a are fixed to each other using the bolts 11, and the energy storage module body 30 and the lid portion 20 are fixed to each other using the support portions 34y. With such a configuration, the movement of the energy storage module body 30 with respect to the lid portion 20 is restricted so that a stress applied to the energy storage module body 30 in the inside of the housing 1a can be reduced and, at the same time, swinging of the energy storage module body 30 can be suppressed so that the reliability of the energy storage apparatus can be enhanced.

In the embodiment 3, a part for fixing the support portion 34y and the lid portion 20 of the housing 1a to each other can be omitted so that the energy storage apparatus 5 can be manufactured at a lower cost.

Further, the support portions 34y are formed on the base 34x of the electrical component sub unit 34 and hence, the support portions 34y are positioned within an upper surface of the energy storage module body 30. That is, the support portions 34y are connected to the energy storage module body 30 within a region where the energy storage module body 30 is positioned as viewed in a direction toward the bottom wall 10a from the lid portion 20. In other words, in the same manner as the top plate portions 35b of the support members 35 in the embodiment 1 shown in FIG. 4, the support portions 34y are arranged inside a projection surface P of a main surface of the energy storage module body 30 obtained by projecting the main surface of the energy storage module body 30 to an inner wall of the lid portion 20. With such a configuration, it is possible to prevent the energy storage module body 30 from becoming large-sized due to the provision of the support portions 34y, and the miniaturization of the energy storage apparatus can be realized or an energy storage module having a large capacity with a housing having the same size as a housing in the embodiment 1 can be realized while acquiring the advantageous effects substantially equal to the advantageous effects acquired in the above-mentioned embodiment 1.

As has been described in the respective embodiments heretofore, the energy storage apparatus of the present invention includes the support members or the like which restrict the movement of the energy storage module body 30 with respect to the lid portion 20 in the inside of the housing 1a by a means such as fixing. Accordingly, an effect of an impact or vibrations exerted on the energy storage module body 30 can be reduced so that the reliability of the energy storage apparatus can be enhanced.

On the other hand, the present invention is not limited by the above-mentioned respective embodiments.

In the above-mentioned respective embodiments, in the inside of the housing 1a, the energy storage module body 30 includes the cell stack 32 where the batteries 320a are arranged in a row in a direction parallel to the mounting surface. However, the configuration of the energy storage module body 30 is not limited to the above case.

Figure 12:
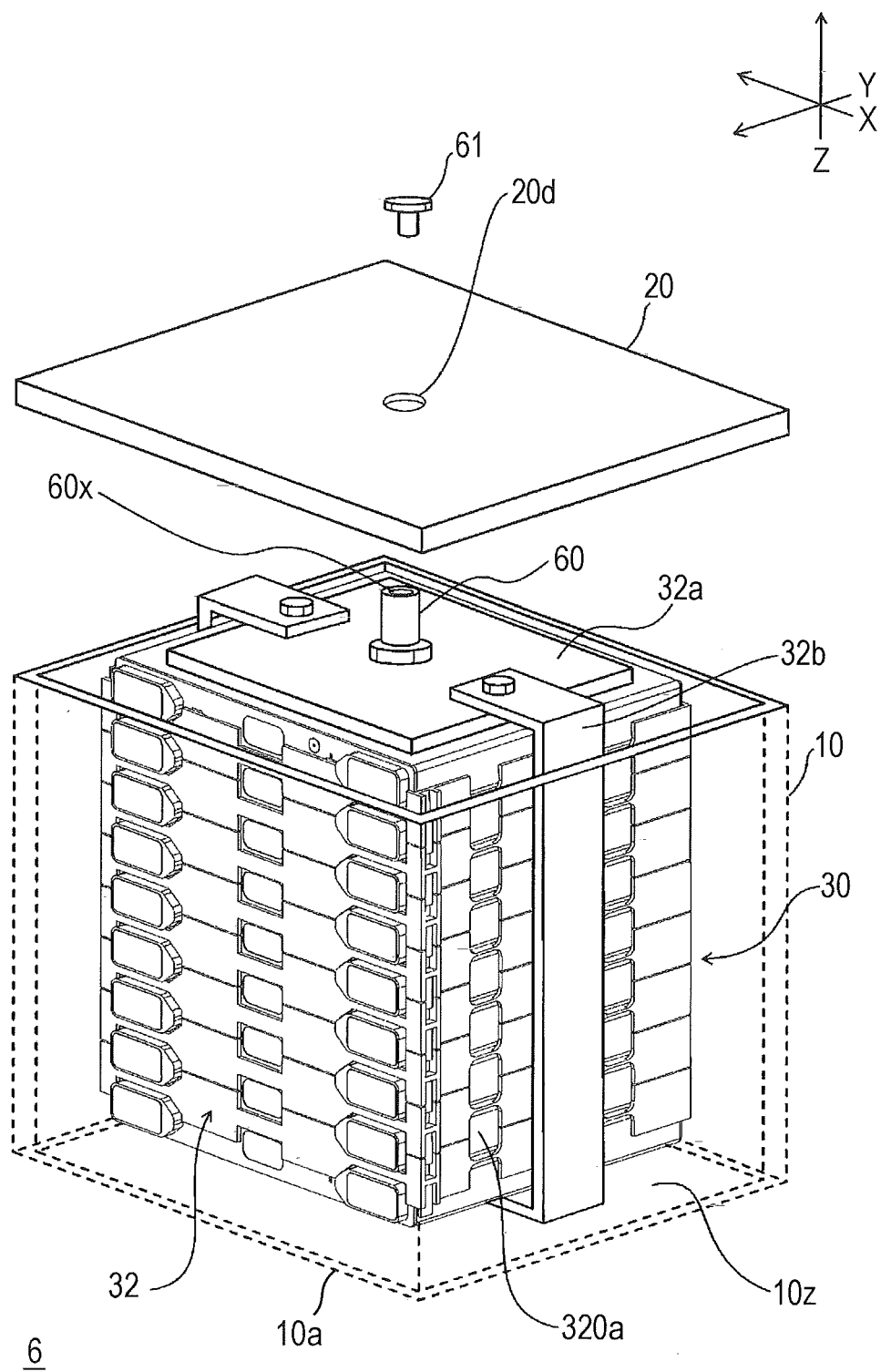
FIG. 12 is an exploded perspective view showing another example of the energy storage apparatus.

As one example, an energy storage apparatus 6 shown in FIG. 12 includes a cell stack 32 where a plurality of batteries 320a is arranged in a direction toward a lid portion 20 from a bottom wall 10a. FIG. 12 is an exploded perspective view showing another example of the energy storage apparatus.

That is, as shown in FIG. 12, the energy storage apparatus 6 is configured such that, in an energy storage module body 30 housed in a container body 10 of a housing 1a, the cell stack 32 is configured such that the batteries 320a are stacked upwardly from an inner bottom surface 10z which corresponds to a mounting surface. The cell stack 32 is fixed to the inner bottom surface 10z of the bottom wall 10a using bolts or the like at positions in blind spots in the drawing. The cell stack 32 is fixed to the lid portion 20 by threadedly fastening a bolt 61 to a threaded hole 60x formed in a support member 60 which is formed on an end plate 32a disposed on the cell stack 32 through an opening 20d formed in the lid portion 20.

In the same manner as the above-mentioned respective embodiments, the energy storage module body 30 is fixed to the bottom wall 10a by the bolts 11 or the like (not shown in the drawing).

With such a configuration, in the same manner as the above-mentioned respective embodiments, in the energy storage apparatus 6, the swinging of the energy storage module body 30 in the inside of the housing 1a can be suppressed. Particularly, the cell stack 32 is arranged such that the plurality of batteries 320a is arranged in the direction toward the lid portion 20 from the bottom wall 10a and hence, the movement of the energy storage module body 30 can be restricted by sandwiching the plurality of batteries 320a between the support member 60 and the bolts 11 in the arrangement direction. With such a configuration, vibrations or the swinging of the energy storage module body 30 in the inside of the housing 1a can be suppressed in a stable manner. In the energy storage apparatus 6, one support member 60 is provided. However, in the same manner as the respective embodiments, the plurality of support members 60 may be provided.

In the above-mentioned description, the support members 35 or the like are parts independent from the energy storage module body 30. The support portions 34y form portions of the energy storage module body 30, and are fixedly mounted on the energy storage module body 30 by welding or are movable in the specific direction due to fitting engagement. However, it is sufficient that the support members 35 or the like and the support portions 34y can restrict the movement of the energy storage module body 30 with respect to the lid portion 20 of the housing 1a so that the support members 35 or the like and the support portions 34y are not limited with respect to a specific means for restricting the movement of the energy storage module body 30. For example, the support members 35 or the like and the lid portion 20 may be fixed to each other by means such as welding, deposition welding or bonding. The support members 35 or the like and the lid portion 20 may be fitted to or engaged with each other in a movable manner in the vertical direction. In the same manner, the support portions 34y may not be fitted in the openings formed in the lid portion 20, and may be engaged with protruding portions or the like formed on the lid portion 20.

In the above-mentioned description, the bolts 11 are parts independent from the energy storage module body 30. However, the bolts 11 may form portions of the energy storage module body 30. A fixing means (first restricting portion) for fixing the energy storage module body 30 to the bottom wall 10a is not limited to the bolt 11. The energy storage module body 30 may be fixedly mounted to the bottom wall 10a by welding, deposition welding, bonding or the like. The energy storage module body 30 may be configured to be movable in the specific direction by fitting or engagement. That is, in the same manner as the support members 35 or the like and the support portions 34y, it is sufficient that the first restricting portion can restrict the movement of the energy storage module body 30 with respect to the bottom wall 10a of the housing 1a, and the first restricting portion is not limited by a specific means for restricting the movement of the energy storage module body 30.

In the above-mentioned description, the support members 35 or the like and the support portions 34y restrict the movement of the energy storage module body 30 in all directions along the lid portion 20. However, it is sufficient that the support members 35 or the like and the support portions 34y can restrict the movement of the energy storage module body 30 in at least one direction out of directions along the lid portion 20. However, from a viewpoint of reducing an effect of impact or vibrations and the like, as in the case of the support members 35 or the like and the support portions 34y, it is preferable that the support members 35 or the like and the support portions 34y restrict the movement of the energy storage module body 30 in all directions along the lid portion 20. The same goes for the restriction of the movement of the energy storage module body 30 with respect to the bottom wall 10a performed by the first restricting portion.

In the above-mentioned description, the support members 35 or the like are fixed to the end plates 32a by threadedly fastening the bolts to the end plates 32a. However, it is sufficient that one end of each support member 35 is fixed to the energy storage module body 30. The support member 35 is not limited by a specific mode for fixing the support member 35. The support member 35 or the like and the end plate 32a may be fixed to each other by a means such as welding or pressure bonding besides fastening. The end plate 32a and the support member 35 or the like may be integrally formed by the same base member. The bolts 11 may be fixed to a member other than the end plate 32a.

In the above-mentioned description, the support members 50 or the support portions 34y form portions of the heat insulator 333 of the bus bar assembly unit 33 or portions of the base 34x of the electrical component sub unit 34, wherein the heat insulator 333 and the base 34x are functional parts of the energy storage module body 30. However, it is sufficient that the support members 50 or the support portions 34y can restrict the movement of the energy storage module body 30 with respect to the housing 1a on the upper portions of the energy storage module body 30. It is also sufficient that the support members 50 or the support portions 34y are portions of desired parts which form the energy storage module body 30.

However, as described above, by forming the restricting means such as the support member 50 or the support portion 34y as portions of parts insulated from the battery 320a or the cell stack 32, the advantageous effect of restricting the movement of the energy storage module body 30 can be further enhanced and, at the same time, it is possible to avoid the effect exerted on electrical wires when a stress is applied to the restricting means or the like. Accordingly, such configuration is more preferable.

In the above-mentioned description, the housing 1a in the present invention is formed of a container which is made of a synthetic resin, and has a hexahedral profile shape, and the housing 1a is formed by hermetically sealing the container body 10 and the lid portion 20 to each other by deposition welding or the like. The movement of the energy storage module body 30 with respect to the lid portion 20 and the bottom wall 10a is restricted. To be more specific, it is sufficient that the support members 35, the bolts 11 and the like can restrict the movement of the energy storage module body 30 with respect to the housing 1a at two positions of an upper portion and a lower position of the energy storage module body 30, and positions at which the movement of the energy storage module body 30 is restricted are not limited with respect to the specific configuration of the housing 1a. For example, an opening portion may be formed in the side wall 10b of the container body 10, or the container body 10 may include a columnar member which is connected to the lid portion 20 in place of the side wall 10b. Further, the housing 1a may be configured such that an open box-shaped lid portion may be disposed on a flat-plate-shaped bottom wall. In this case, the energy storage module body 30 is fixed to a ceiling portion of the lid portion using support members.

The housing 1a is not limited by the specific configuration thereof. That is, the housing 1a may be made of metal, other materials or the combination of these materials besides a synthetic resin. The housing 1a may be also formed by combining three or more members together. Further, a profile of the housing 1a may be a cubic shape, a circular cylindrical shape or a polygonal columnar shape. That is, in the present invention, the housing 1a is not limited by a shape, a specific material and the configuration. It is sufficient for the present invention that the housing 1a is formed of an outer covering arranged outside the energy storage module body 30.

In the above-mentioned description, the energy storage devices used as the batteries 320a for forming the cell stack 32 are nonaqueous electrolyte secondary batteries represented by lithium ion secondary batteries. However, provided that the energy storage devices are batteries which can be charged and discharged by an electrochemical reaction, nickel-metal hydride batteries or other kinds of secondary batteries may be also used as the energy storage devices. Primary batteries may be used as the energy storage devices. Further, electric double layer capacitors or other kinds of capacitors may be used as the energy storage devices. That is, provided that the energy storage device of the present invention is an element which is formed by sealing an electrode assembly and an electrolyte solution in a storage container and can store electricity therein, the energy storage device of the present invention is not limited with respect to a specific method of generating an electromotive force.

That is, the present invention may be carried out in the form that various modifications are applied to the above-mentioned embodiments including the above-mentioned modifications without departing from the gist of the present invention.

The present invention having the above-mentioned configuration can acquire an advantageous effect of enhancing the reliability of the energy storage apparatus by reducing an effect of impact or vibrations, and can be effectively applicable to an energy storage apparatus having energy storage devices such as secondary batteries, for example.

What is claimed is:

1. An energy storage apparatus,. comprising:
   a housing which includes a container body and a lid portion provided with external connection terminals;
   an energy storage module which is arranged in the housing, the energy storage module including a cell stack;
   a first restricting portion which restricts a movement of the energy storage module with respect to a bottom wall of the container body; and
   a second restricting portion which extends toward the lid portion from the energy storage module and restricts a movement of the energy storage module with respect to the lid portion.

2. The energy storage apparatus according to claim 1, wherein the first restricting portion fixes the energy storage module to the bottom wall, and
   wherein the second restricting portion fixes the energy storage module to the lid portion.

3. The energy storage apparatus according to claim 1, wherein the second restricting portion is disposed at positions which correspond to both ends of the cell stack.

4. The energy storage apparatus according to claim 1, wherein the second restricting portion is connected to the lid portion outside a region where the energy storage module is positioned as viewed in a direction toward the bottom wall from the lid portion.

5. The energy storage apparatus according to claim 1, wherein the second restricting portion is connected to the lid portion within a region where the energy storage module is positioned as viewed in a direction toward the bottom wall from the lid portion.

6. The energy storage apparatus according to claim 1, wherein the second restricting portion is connected to the energy storage module within a region where the energy storage module is positioned as viewed in a direction toward the bottom wall from the lid portion.

7. The energy storage apparatus according to claim 1, wherein the second restricting portion includes a bent portion between a connecting portion between the second restricting portion and the energy storage module and a connecting portion between the second restricting portion and the lid portion.

8. The energy storage apparatus according to claim 1, wherein the cell stack includes end plates which sandwich a plurality of the energy storage devices arranged in a row from both ends of the row, and
   wherein the second restricting portion is fixed to the end plates.

9. The energy storage apparatus according to claim 1, wherein the second restricting portion is inserted into an opening formed in the lid portion.

10. The energy storage apparatus according to claim 1, wherein the cell stack is arranged in a direction that the plurality of energy storage devices is arranged toward the lid portion from the bottom wall.

11. An energy storage apparatus, comprising:
    a housing which includes a container body and a lid portion provided with external connection terminals;
    an energy storage module which is arranged in the housing, the energy storage module including a cell stack;
    a first restricting portion which restricts a movement of the energy storage module with respect to a bottom wall of the container body; and
    a second restricting portion which is inserted into an opening formed in the lid portion and restricts a movement of the energy storage module with respect to the lid portion.

12. The energy storage apparatus according to claim 11, wherein the second restricting portion extends toward the lid portion.

13. The energy storage apparatus according to claim 12, wherein the first restricting portion is inserted into an opening formed in the bottom wall of the container body.

14. The energy storage apparatus according to claim 11, wherein the first restricting portion is inserted into an opening formed in the bottom wall of the container body.

15. The energy storage apparatus according to claim 1, wherein the second restricting portion extends toward the lid portion.

16. The energy storage apparatus according to claim 1, wherein the first restricting portion is inserted into an opening formed in the bottom wall of the container body.

\* \* \* \* \*